(12) United States Patent
Lee et al.

(10) Patent No.: US 11,188,167 B2
(45) Date of Patent: Nov. 30, 2021

(54) FORCE SENSOR AND DISPLAY DEVICE INCLUDING THE SAME

(71) Applicant: Samsung Display Co., LTD., Yongin-si (KR)

(72) Inventors: Hyeon Jun Lee, Seoul (KR); Won Ki Hong, Suwon-si (KR); So Hee Park, Cheonan-si (KR); Hee Seomoon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/893,310

(22) Filed: Jun. 4, 2020

(65) Prior Publication Data

US 2021/0117064 A1 Apr. 22, 2021

(30) Foreign Application Priority Data

Oct. 21, 2019 (KR) .......................... 10-2019-0130927

(51) Int. Cl.
*G06F 3/041* (2006.01)

(52) U.S. Cl.
CPC ........ *G06F 3/04146* (2019.05); *G06F 3/0418* (2013.01); *G06F 2203/04102* (2013.01)

(58) Field of Classification Search
CPC ............... G06F 3/04146; G06F 3/0418; G06F 2203/04102
See application file for complete search history.

(56) References Cited

U.S. PATENT DOCUMENTS

| 7,538,760 | B2 | 5/2009 | Hotelling et al. |
| 8,692,795 | B1* | 4/2014 | Kremin ............... G06F 3/04186 345/174 |
| 2006/0097991 | A1* | 5/2006 | Hotelling .............. G06F 3/0412 345/173 |
| 2010/0097329 | A1* | 4/2010 | Simmons ............ G06F 3/04166 345/173 |
| 2013/0127756 | A1* | 5/2013 | Wang ..................... G06F 3/0418 345/173 |
| 2014/0028575 | A1 | 1/2014 | Parivar et al. |
| 2014/0085213 | A1 | 3/2014 | Huppi et al. |
| 2014/0091857 | A1 | 4/2014 | Bernstein |

(Continued)

FOREIGN PATENT DOCUMENTS

KR 10-2011-0053595 A 5/2011
KR 10-2011-0128046 A 11/2011

*Primary Examiner* — Md Saiful A Siddiqui
(74) *Attorney, Agent, or Firm* — Lewis Roca Rothgerber Christie LLP

(57) ABSTRACT

A force sensor includes: a plurality of touch cells comprising a plurality of driving electrodes, a pressure sensing layer overlapping the driving electrodes, and a plurality of sensing electrodes overlapping the pressure sensing layer; and a touch driver configured to receive a raw data from the plurality of touch cells and to detect a touch pressure applied to the plurality of touch cells. The touch driver includes: a filtering unit configured to filter the raw data and to output sensing data; a data storage unit configured to store max data having the highest value from among the sensing data and propagation data of at least one adjacent touch cell adjacent to a max touch cell having the max data; and a noise removing unit configured to detect and remove noise from the sensing data.

19 Claims, 24 Drawing Sheets

(56) References Cited

U.S. PATENT DOCUMENTS

2014/0092064 A1    4/2014    Bernstein et al.
2014/0293145 A1   10/2014   Jones et al.
2016/0062537 A1*  3/2016    Kim .................... G06F 3/0445
                                                             345/174
2017/0131840 A1    5/2017    Deichmann et al.

\* cited by examiner

ADJ: ADJ1, ADJ2, ADJ3, ADJ4
NIS: NIS1, NIS2, NIS3, NIS4

FORCE SENSOR AND DISPLAY DEVICE INCLUDING THE SAME

CROSS-REFERENCE TO RELATED APPLICATION

This application claims priority to and the benefit of Korean Patent Application No. 10-2019-0130927, filed on Oct. 21, 2019, in the Korean Intellectual Property Office, the disclosure of which is incorporated herein by reference in its entirety.

BACKGROUND

1. Field

Aspects of embodiments of the present disclosure relate to a force sensor and a display device including the same.

2. Description of the Related Art

Electronic equipment, such as smartphones, tablet personal computers (PCs), digital cameras, notebook computers, navigation devices, and smart televisions, generally includes a display device for displaying an image to a user. The display device may include a display panel for generating and displaying the image and a variety of input devices.

Recently, a touch panel for recognizing a touch input has been applied to smartphones and tablet PCs as an input device. A touch panel may replace a key pad or a similar conventional physical input device, due to the convenience of the touch scheme. In addition to touch panels, research has been conducted on the installation and use of a force sensor in a display device.

SUMMARY

Aspects of embodiments of the present disclosure provide a force sensor configured to accurately detect and remove noise to precisely sense a touch position even when the force sensor is relatively low-cost and high-efficiency, and a display device including the same.

Aspects and features of the present disclosure, however, are not limited to the above-described aspects and features, and other aspects and features of the present disclosure will be apparent to those skilled in the art from the following description.

According to an embodiment of the present disclosure, a force sensor includes: a plurality of touch cells including (e.g., formed by) a plurality of driving electrodes, a pressure sensing layer overlapping the plurality of driving electrodes, and a plurality of sensing electrodes overlapping the pressure sensing layer; and a touch driver configured to receive a plurality of pieces of raw data from the plurality of touch cells and to detect a touch pressure applied to the plurality of touch cells. The touch driver includes: a filtering unit configured to filter the plurality of pieces of raw data and to output a plurality of pieces of sensing data; a data storage unit configured to store max data having the highest value from among the plurality of pieces of sensing data and propagation data of at least one adjacent touch cell adjacent to a max touch cell having the max data; and a noise removing unit configured to detect and remove noise from the plurality of pieces of sensing data.

The noise removing unit may be configured to determine that data of at least one of the touch cells spaced a distance from the max touch cell is noise.

The noise removing unit may be configured to determine that data of at least one of the touch cells not directly adjacent to the max touch cell is noise.

The noise removing unit may be configured to determine that data of at least one of the touch cells having no adjacent touch cell from among the plurality of touch cells having the plurality of pieces of sensing data is noise.

The data storage unit may be configured to store the max data and propagation data of first to fourth adjacent touch cells adjacent to upper, lower, left, and right sides of the max touch cell when viewed from above.

The touch driver may further include a position detection unit configured to detect a touch position where the touch pressure is applied based on a position of the max touch cell, a value of the max data, a position of the at least one adjacent touch cell, and a value of the propagation data.

The position detection unit may be configured to calculate the touch position by using Equation 1 when one adjacent touch cell is adjacent to the max touch cell:

$$x = \frac{d1 \times x1 + d2 \times x2}{d1 + d2} \quad \text{[Equation 1]}$$

wherein x is touch position, d1 is max data value, d2 is propagation data value, x1 is position of max touch cell, and x2 is position of adjacent touch cell.

The max touch cell may have a first area adjacent to the adjacent touch cell and a second area not adjacent to the adjacent touch cell, and the position detection unit may be configured to detect a portion of the first area of the max touch cell as the touch position where the touch pressure is applied.

The position detection unit may be configured to calculate the touch position by using Equation 2 when a plurality of adjacent touch cells is adjacent to the max touch cell:

$$x = \frac{d1 \times x1 + d2 \times x2 + \cdots + dn \times xn}{d1 + d2 + \cdots + dn} \quad \text{[Equation 2]}$$

wherein x is touch position, d1 is max data value, d2 is first propagation data value, dn is (n−1)th propagation data value, x1 is position of max touch cell, x2 is position of first adjacent touch cell, and xn is position of (n−1)th adjacent touch cell.

The max touch cell may have a first area adjacent to a first adjacent touch cell having the highest propagation data value from among the plurality of adjacent touch cells and a second area not adjacent to the first adjacent touch cell, and the position detection unit may be configured to detect a portion of the first area of the max touch cell as the touch position where the touch pressure is applied.

The noise removing unit may be configured to remove sensing data not stored by the data storage unit from among the plurality of pieces of sensing data.

According to an embodiment of the present disclosure, a display device includes: a display panel configured to display an image; and a force sensor on one surface of the display panel. The force sensor includes: a plurality of touch cells including (e.g., formed by) a plurality of driving electrodes, a pressure sensing layer overlapping the plurality of driving electrodes, and a plurality of sensing electrodes overlapping the pressure sensing layer; and a touch driver configured to receive a plurality of pieces of raw data from the plurality of touch cells and to detect a touch pressure applied to the plurality of touch cells. The touch driver includes: a filtering unit configured to filter the plurality of pieces of raw data and to output a plurality of pieces of sensing data; a data storage unit configured to store max data having the highest value from among the plurality of pieces of sensing data and propagation data of at least one adjacent touch cell adjacent to a max touch cell having the max data; and a noise removing unit configured to detect and remove noise from the plurality of pieces of sensing data.

According to an embodiment of the present disclosure, a force sensor includes: a plurality of touch cells including (e.g., formed by) a plurality of driving electrodes configured to receive a touch driving voltage, a plurality of sensing electrodes configured to output a plurality of pieces of raw data, and a pressure sensing layer between the plurality of driving electrodes and the plurality of sensing electrodes; and a touch driver configured to receive the plurality of pieces of raw data and to detect a touch pressure applied to the plurality of touch cells. The touch driver includes: a data storage unit configured to store max data having the highest value from among the plurality of pieces of raw data and propagation data of at least one adjacent touch cell adjacent to a max touch cell having the max data; and a filtering unit configured to filter out raw data not stored in the data storage unit from among the plurality of pieces of raw data.

The data storage unit may be configured to store the max data and propagation data of first to fourth adjacent touch cells adjacent to upper, lower, left, and right sides of the max touch cell when viewed from above.

The touch driver may further include a position detection unit configured to detect a touch position where the touch pressure is applied based on a position of the max touch cell, a value of the max data, a position of the at least one adjacent touch cell, and a value of the propagation data.

The position detection unit may be configured to calculate the touch position by using Equation 1 when one adjacent touch cell is adjacent to the max touch cell:

$$x = \frac{d1 \times x1 + d2 \times x2}{d1 + d2}$$ [Equation 1]

wherein x is touch position, d1 is max data value, d2 is propagation data value, x1 is position of max touch cell, and x2 is position of adjacent touch cell.

The max touch cell may have a first area adjacent to the adjacent touch cell and a second area not adjacent to the adjacent touch cell, and the position detection unit may be configured to detect a portion of the first area of the max touch cell as the touch position where the touch pressure is applied.

The position detection unit may be configured to calculate the touch position by using Equation 2 when a plurality of adjacent touch cells is adjacent to the max touch cell:

$$x = \frac{d1 \times x1 + d2 \times x2 + \cdots + dn \times xn}{d1 + d2 + \cdots + dn}$$ [Equation 2]

wherein x is touch position, d1 is max data value, d2 is first propagation data value, dn is (n−1)th propagation data value, x1 is position of max touch cell, x2 is position of first adjacent touch cell, and xn is position of (n−1)th adjacent touch cell.

The max touch cell may have a first area adjacent to an adjacent touch cell having the highest propagation data value from among the plurality of adjacent touch cells and a second area adjacent to the other adjacent touch cells from among the plurality of adjacent touch cells, and the position detection unit may be configured to detect a portion of the first area of the max touch cell as the touch position where the touch pressure is applied.

According to an embodiment of the present disclosure, a display device includes: a display panel configured to display an image; and a force sensor on one surface of the display panel. The force sensor includes: a plurality of touch cells including (e.g., formed by) a plurality of driving electrodes configured to receive a touch driving voltage, a plurality of sensing electrodes configured to output a plurality of pieces of raw data, and a pressure sensing layer between the plurality of driving electrodes and the plurality of sensing electrodes; and a touch driver configured to receive the plurality of pieces of raw data and to detect a touch pressure on the plurality of touch cells. The touch driver includes: a data storage unit configured to store max data having the highest value from among the plurality of pieces of raw data and propagation data of at least one adjacent touch cell adjacent to a max touch cell having the max data; and a filtering unit configured to filter out raw data not stored in the data storage unit from among the plurality of pieces of raw data.

BRIEF DESCRIPTION OF THE DRAWINGS

The above and other aspects and features of the present disclosure will become more apparent by describing exemplary embodiments thereof, in detail, with reference to the attached drawings, in which.

DETAILED DESCRIPTION

Figure 1:
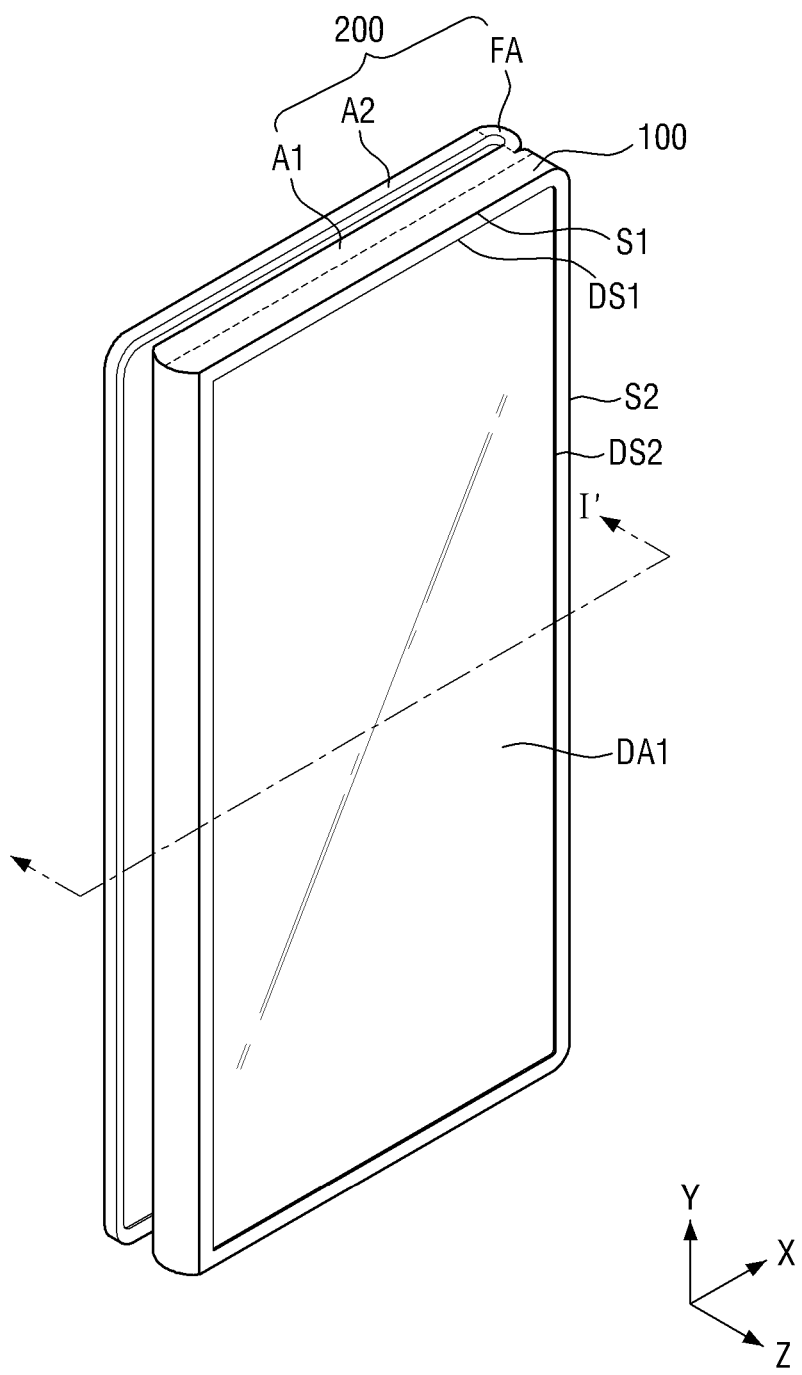
FIG. 1 is a perspective view showing a display device in a folded configuration according to an embodiment.

In the following description, for the purposes of explanation, numerous details are set forth in order to provide a thorough understanding of various exemplary embodiments or implementations of the present disclosure. As used herein, "embodiments" and "implementations" are interchangeable words that indicate non-limiting examples of devices or methods employing one or more of the inventive concepts disclosed herein. It is apparent, however, that various exemplary embodiments may be practiced without the described details or with one or more equivalent arrangements. In other instances, well-known structures and devices are shown in block diagram form to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing example features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements") of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc. of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of the stated features, integers, steps, operations, elements, components, and/or groups thereof but do not preclude the presence or addition of one or more other features, integers, steps, operations, elements, components, and/or groups thereof. It is also noted that, as used herein, the terms "substantially," "about," and other similar terms are used as terms of approximation and not as terms of degree, and, as such, are utilized to account for inherent deviations in measured, calculated, and/or provided values that would be recognized by one of ordinary skill in the art.

Further, the use of "may" when describing embodiments of the present invention relates to "one or more embodiments of the present invention." Also, the term "exemplary" is intended to refer to an example or illustration.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some aspects of exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
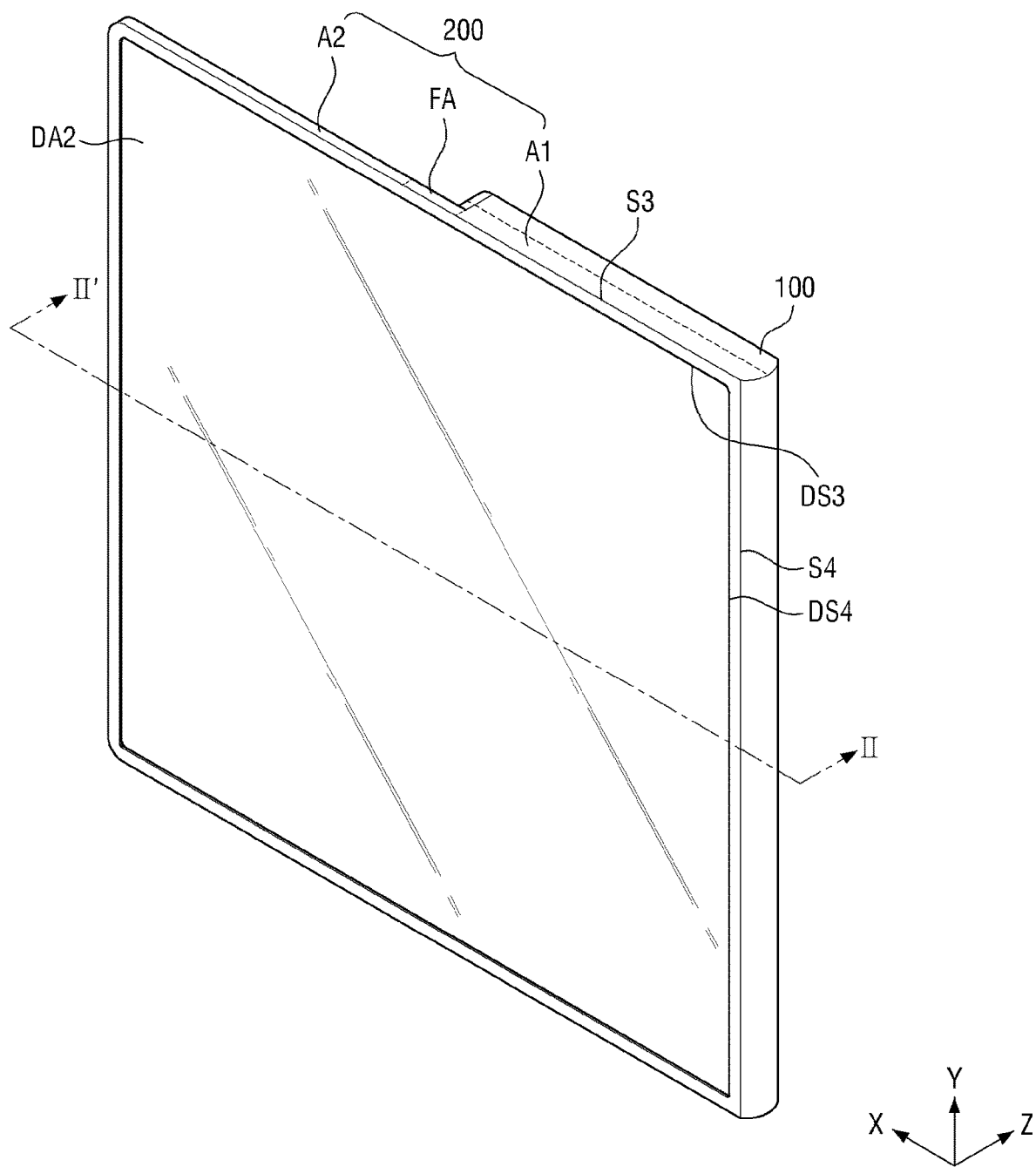
FIG. 2 is a perspective view showing the display device shown in FIG. 1 in an unfolded configuration according to an embodiment.

FIG. 1 is a perspective view showing a display device in a folded configuration (or folded state) according to an embodiment, and FIG. 2 is a perspective view showing the display device in an unfolded configuration (or unfolded state).

In this specification, the terms "above," "top," "upper surface," and "upper end" indicate an upward direction with respect to the display device, that is, a Z-axis direction, and "below," "bottom," "lower surface," and "lower end" indicate a downward direction with respect to the display device, that is, a direction opposite to the Z-axis direction. Also, the terms "left," "right," "up," and "down" refer to directions represented when the display device is viewed from the top down. For example, the term "right" indicates an X-axis direction, the term "left" indicates a direction opposite to the X-axis direction, the term "up" indicates a Y-axis direction, and the term "down" indicates a direction opposite to the Y-axis direction.

Referring to FIGS. 1 and 2, the display device may include a first display unit 100 having a first display area DA1 and a second display unit 200 having a second display area DA2.

The first display unit 100 may have a rectangular planar shape. For example, the first display unit 100 may have a rectangular shape having first sides 51 in (e.g., extending in) a first direction (the x-axis direction) and second sides S2 in (e.g., extending in) a second direction (the y-axis direction). The first sides 51 may be shorter than the second sides S2. An edge (or corner) at where one of the first sides 51 meets a corresponding one of the second sides S2 may be rounded with a curvature (e.g., a predetermined curvature) or may have (or may be) a right angle. The first display unit 100 may have other planar shapes other than a rectangular, such as a polygon, circle, or oval.

The first display area DA1 of the first display unit 100 may have a rectangular planar shape formed by first display sides DS1 parallel to the first sides 51 in the first direction (the x-axis direction) and second display sides DS2 parallel to the second sides S2 in the second direction (the y-axis direction). For example, the first display sides DS1 may be shorter than the second display sides DS2. An edge (or corner) at where one of the first display sides DS1 meets a corresponding one of the second display sides DS2 may be rounded with a curvature (e.g., a predetermined curvature) or may have (or may be) a right angle. The first display area DA1 may have a planar shape other than rectangular, such as a polygon, circle, or oval.

The second display unit 200 may include a first area A1, a second area A2, and a folding area FA disposed between the first area A1 and the second area A2. The second display unit 200 may be folded as shown in FIG. 1 or unfolded as shown in FIG. 2 depending on the state of the folding area FA (e.g., the second display unit 200 may be folded about the folding area FA). The second display unit 200 may have a rectangular planar shape when unfolded. The second display unit 200 may have a rectangular planar shape having third sides S3 in (e.g., extending in) the first direction (the x-axis direction) and fourth sides S4 in (e.g., extending in) the second direction (the y-axis direction). For example, the third sides S3 may be longer than the fourth sides S4. In this case, a user may watch a screen having a long side in the first direction (the x-axis direction). As another example, the third sides S3 may be shorter than the fourth sides S4. In this case, a user may watch a screen having a long side in the second direction (the y-axis direction). As still another example, the third sides S3 may have substantially the same length as the fourth sides S4. In this case, a user may watch a square (or substantially square) screen. An edge (or corner) at where one of the third sides S3 meets a corresponding one of the fourth sides S4 may be rounded with a curvature (e.g., a predetermined curvature) or may have (or may be) a right angle. The second display unit 200 may have a planar shape other than rectangular, such as a polygon, circle, or oval.

The second display area DA2 of the second display unit 200 may have a rectangular planar shape formed by third display sides DS3 parallel to the third sides S3 in the first direction (the x-axis direction) and fourth display sides DS4 parallel to the fourth sides S4 in the second direction (the y-axis direction) when unfolded. For example, the third display sides DS3 may be longer than the fourth display sides DS4. As another example, the third display sides DS3 may be shorter than the fourth display sides DS4. As still another example, the third display sides DS3 may have the substantially the same length as the fourth display sides DS4. An edge (or corner) at where one of the third display sides DS3 meets a corresponding one of the fourth display sides DS4 may be rounded with a curvature (e.g., a predetermined curvature) or may have (or may be) a right angle. The second display area DA2 may have a planar shape other than rectangular, such as a polygon, circle, or oval.

For example, the second display unit 200 may be easily folded at the folding area FA by having (or including) a flexible substrate which is bendable, foldable, and/or rollable. As another example, the second display unit 200 may include a hinge disposed on one surface of the second display unit 200 to complement the folding function of the folding area FA.

While folded as shown in FIG. 1, the second display unit 200 may be folded such that the second display area DA2 of the first area A1 and the second display area DA2 of the second area A2 face each other (In-Folding). The second display area DA2 of the second display unit 200 may be folded by the second display unit 200 being bent in the folding area FA with a curvature (e.g., a predetermined curvature). For example, the first display area DA1 of the first display unit 100 and the second display area DA2 of the second display unit 200 may face a third direction (the z-axis direction).

The display device may display an image in the third direction (the z-axis direction) by using the first display unit 100 when the second display unit 200 is folded. The display device may display an image in a direction opposite to the third direction (the z-axis direction) by using the second display unit 200 when the second display unit 200 is unfolded. When the second display unit 200 is unfolded, the first display unit 100 may display images in the third direction (the z-axis direction) or may not display any image.

Figure 3:
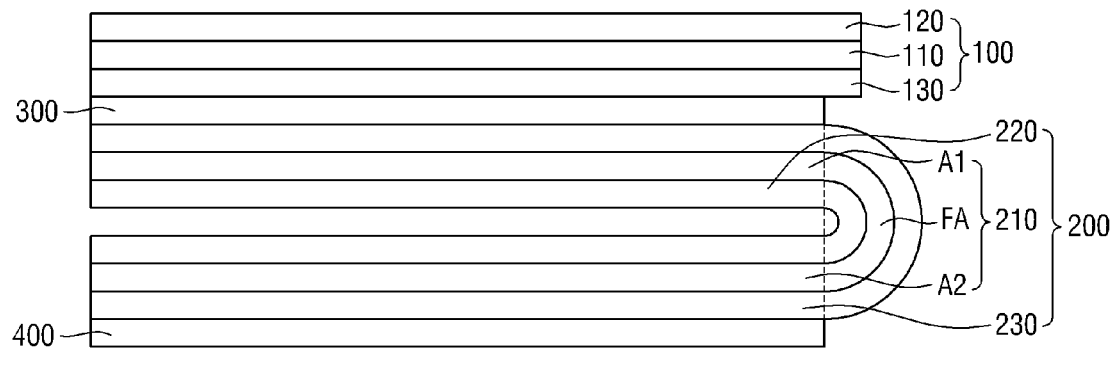
FIG. 3 is a diagram of a cross-section taken along the line I-I' of FIG. 1.
Figure 4:
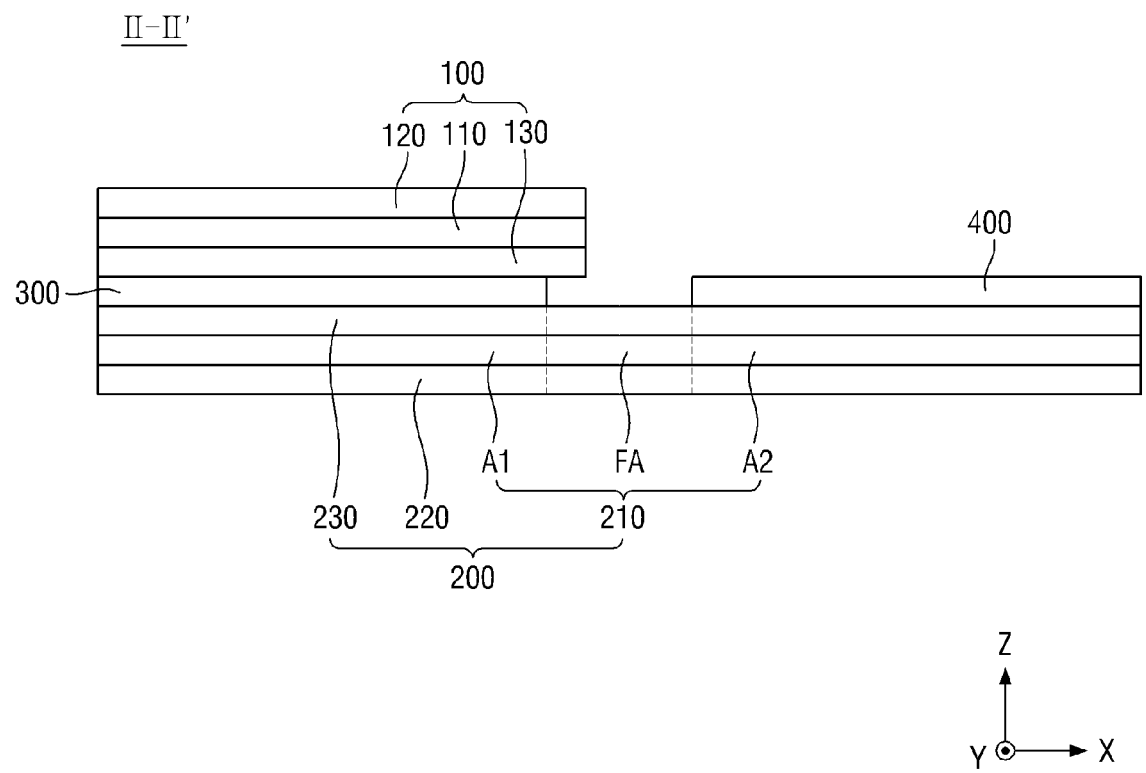
FIG. 4 is a diagram of a cross section taken along the line II-II' of FIG. 2.

FIG. 3 is a diagram of a cross section taken along the line I-I' of FIG. 1, and FIG. 4 is a diagram of a cross section taken along the line II-II' of FIG. 2.

Referring to FIGS. 3 and 4, the display device may include the first display unit 100, the second display unit 200, a first lower panel member 300, and a second lower panel member 400.

The first display unit 100 may display images in the third direction (the z-axis direction). The first display unit 100 may be disposed on one surface of the first lower panel member 300 and may be supported by the first lower panel member 300. The first display unit 100 may include a first display panel 110, a first cover window 120, and a first force sensor 130.

The first display panel 110 may include an organic light emitting display panel including an organic light emitting diode, a micro light emitting diode display panel including a micro light emitting diode (LED), and/or a quantum dot light emitting display panel including a quantum dot light emitting diode. The following description describes an embodiment of the first display panel 110 which includes (e.g., which is) an organic light emitting display panel, but the present invention is not limited thereto. The first display panel 110 may be disposed closer to the first cover window 120 than the first force sensor 130 (e.g., the first display panel 110 may be arranged between the first cover window 120 and the first force sensor 130), and thus, it is possible to improve the quality of the display device.

The first cover window 120 may be disposed above the first display panel 110 (e.g., may be disposed nearer to a user than the first display panel 110 is). The first cover window 120 can protect the first display panel 110 by covering an upper surface of the first display panel 110. The first cover window 120 may be attached onto the first display panel 110 by a transparent adhesive member. The first cover window 120 may correspond to the surface of the first display area DA1 and may directly contact a user's body (e.g., a user may touch the first cover window 120 in use). For example, the first cover window 120 may be made of at least one of glass, sapphire, and plastic. The first cover window 120 may be rigid or flexible.

The first force sensor 130 may be disposed below the first display panel 110. The first force sensor 130 may detect a user's touch generated on (or applied to) the first cover window 120. The first force sensor 130 may be disposed to overlap the full (or the entire) surface of the first display panel 110. The first force sensor 130 may be disposed to overlap the full (or entire) surface of the first cover window 120. For example, the first force sensor 130 may include a plurality of touch cells overlapping the full surface of the first display panel 110 or the full surface of the first cover window 120. A touch cell below a touch (e.g., a touch cell below a touch on the first cover window 120) from among the plurality of touch cells of the first force sensor 130 may experience a change in resistance value depending on the magnitude of the pressure (e.g., the pressure of the touch on the first cover window 120). Accordingly, the first force sensor 130 may detect the position of the touch on the basis of the position of the touch cell having the changed resistance value and may detect the magnitude of the touch pressure on the basis of the degree to which the resistance value changes.

The second display unit 200 may be folded as shown in FIG. 3 or unfolded as shown in FIG. 4 depending on the state of the folding area FA. The second display unit 200 may display images in a direction opposite to the third direction (the z-axis direction) when unfolded. The second display unit 200 may include a second display panel 210, a second cover window 220, and a second force sensor 230.

The second display panel 210 may include an organic light emitting display panel including an organic light emitting diode, a micro light emitting diode display panel including a micro light emitting diode (LED), and a quantum dot light emitting display panel including a quantum dot light emitting diode.

The second display panel 210 may include a first area A1, a second area A2, and a folding area FA between the first area A1 and the second area A2. For example, the second display panel 210 may be easily folded at the folding area FA by including (or having) a flexible substrate which is bendable, foldable, and/or rollable. In some embodiments, the second display panel 210 may include a hinge disposed on one surface of the second display unit 200 to complement the folding function of the folding area FA.

The first area A1 of the second display panel 210 may be disposed on the other surface opposite to the one surface of the first lower panel member 300 and may be supported by the first lower panel member 300. The first display panel 110 and the first area A1 of the second display panel 210 may face each other with the first lower panel member 300 interposed therebetween.

The second area A2 of the second display panel 210 may be connected to the first area A1 through the folding area FA. When the folding area FA of the second display panel 210 is folded as shown in FIG. 3, the second area A2 of the second display panel 210 may overlap the first area A1 in the third direction (the z-axis direction). When the folding area FA of the second display panel 210 is unfolded as shown in FIG. 4, the second area A2 of the second display panel 210 may be coplanar with the folding area FA and the first area A1.

The second area A2 of the second display panel 210 may be disposed on one surface of the second lower panel member 400 and may be supported by the second lower panel member 400.

The second cover window 220 may be disposed on one surface of the second display panel 210. The second cover window 220 can protect the second display panel 210 by covering the one surface of the second display panel 210. The second cover window 220 may be attached onto the one surface of the second display panel 210 by a transparent adhesive member. The second cover window 220 may correspond to the surface of the second display area DA2 and may directly contact a user's body. For example, the second cover window 220 may be made of at least one of glass, sapphire, and plastic. A portion of the second cover window 220 may overlap the folding area FA of the second display panel 210, and at least a portion of the second cover window 220 may be formed to be flexible.

The second force sensor 230 may be disposed on the other surface opposite to the one surface of the second display panel 210. The second force sensor 230 may detect a user's touch generated on (or applied to) the second cover window 220. The second force sensor 230 may be disposed to overlap the full surface of the second display panel 210. The second force sensor 230 may be disposed to overlap the full surface of the second cover window 220. For example, the second force sensor 230 may include a plurality of touch cells overlapping the full surface of the second display panel 210 or the full surface of the second cover window 220. A touch cell below a touch (e.g., a touch cell below a touch on the second cover window 220) from among the plurality of touch cells of the second force sensor 230 may experience a change in resistance value depending on the magnitude of the pressure (e.g., the pressure of the touch on the second cover window 220). Accordingly, the second force sensor 230 may detect the position of the touch on the basis of the position of the touch cell having the changed resistance value and may detect the magnitude of the touch pressure on the basis of the degree to which the resistance value is changed.

The first lower panel member 300 may be disposed between the first display unit 100 and the first area A1 of the second display panel 210. The one surface of the first lower panel member 300 may support the first display unit 100, and the other surface of the first lower panel member 300 may support the first area A1 of the second display panel 210. For example, the one surface of the first lower panel member 300 may directly support the first force sensor 130 of the first display unit 100. The one surface of the first lower panel member 300 may indirectly support the first display panel 110 and the first cover window 120. The other surface of the first lower panel member 300 may directly support a portion of the second force sensor 230 overlapping the first area A1 of the second display panel 210. The other surface of the first lower panel member 300 may indirectly support the first area A1 and a portion of the second cover window 220 overlapping the first area A1.

The first lower panel member 300 may include a buffer member and a heat dissipation member. The buffer member of the first lower panel member 300 may absorb external shocks and, thus, may prevent (or reduce the occurrence of) the first display unit 100 and a portion of the second display unit 200 overlapping the first area A1 from being damaged. For example, the buffer member of the first lower panel member 300 may be formed as a single layer or a plurality of layers including (or may be made of) a polymer resin, such as polyurethane, polycarbonate, polypropylene, and polyethylene. As another example, the first lower panel member 300 may include (or may be made of) an elastic material, such as rubber, urethane-based materials, or sponges obtained by foaming acrylic-based materials.

For example, the heat dissipation member of the first lower panel member 300 may include graphite or carbon nanotubes and may block (or substantially block) electromagnetic waves (e.g., electromagnetic radiation). As another example, the heat dissipation member of the first lower panel member 300 may be formed of a thin metal film, such as copper (Cu), nickel (Ni), ferrite, or silver (Ag), which has excellent thermal conductivity and, thus, may dissipate heat generated in the first display unit 100 and/or the second display unit 200.

The second lower panel member 400 may support the second display unit 200. The second lower panel member 400 may directly support a portion of the second force sensor 230 overlapping the second area A2 and may indirectly support the second area A2 and a portion of the second cover window 220 overlapping the second area A2.

When the second display unit 200 is folded as shown in FIG. 3, the second lower panel member 400 may overlap the first lower panel member 300 in the third direction (the z-axis direction). When the second display unit 200 is unfolded as shown in FIG. 4, the second lower panel member 400 may be coplanar with the first lower panel member 300. In FIG. 4, the first lower panel member 300 and the second lower panel member 400 may be spaced (e.g., spaced apart) by a distance corresponding to the folding area FA from each other.

The second lower panel member 400 may include a buffer member and a heat dissipation member. The buffer member of the second lower panel member 400 may absorb external shocks and, thus, may prevent (or reduce the occurrence of) a portion of the second display unit 200 overlapping the second area A2 from being damaged. For example, the buffer member of the second lower panel member 400 may be formed as a single layer or a plurality of layers including (or may be made of) a polymer resin, such as polyurethane, polycarbonate, polypropylene, and polyethylene. As another example, the second lower panel member 400 may include (or may be made of) an elastic material, such as rubber, urethane-based materials, or sponges obtained by foaming acrylic-based materials.

For example, the heat dissipation member of the second lower panel member 400 may include graphite or carbon nanotubes and may block (or substantially block) electromagnetic waves (e.g., electromagnetic radiation). As another example, the heat dissipation member of the second lower panel member 400 may be formed of a thin metal film, such as copper (Cu), nickel (Ni), ferrite, or silver (Ag), which has excellent thermal conductivity and, thus, may dissipate heat generated in the second display unit 200.

Figure 5:
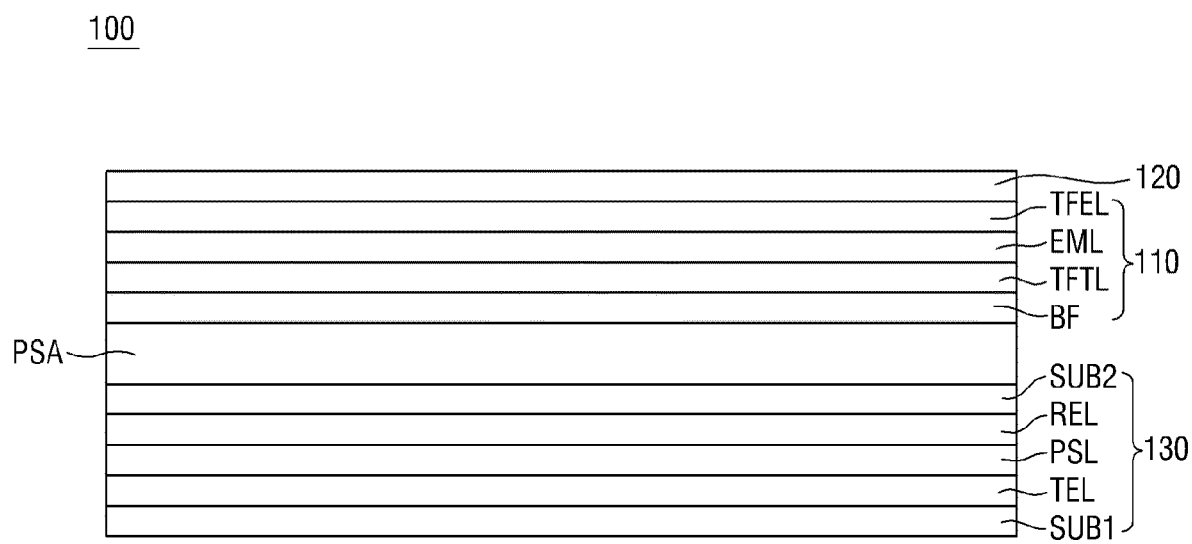
FIG. 5 is a cross-sectional view of a first display unit of the display device shown in FIGS. 1-4 according to an embodiment.

FIG. 5 is a sectional view of a first display unit of a display device according to an embodiment. Here, the sectional view of the first display unit 100 shown in FIG. 5 may have substantially the same configuration as a sectional view of the second display unit 200. For example, the sectional configurations of the first display panel 110, the first cover window 120, and the first force sensor 130 may correspond to the sectional configurations of the second display panel 210, the second cover window 220, and the second force sensor 230, respectively. The sectional configuration of the first display unit 100 will be described in detail, and thus, the description of the sectional configuration of the second display unit 200 will be omitted as being redundant.

Referring to FIG. 5, the first display panel 110 may include a base film BF, a thin-film transistor layer TFTL, a light emitting layer EML, and a thin-film encapsulation layer TFEL.

The base film BF may be a base substrate and may include (or may be made of) an insulating material, such as a polymer resin. For example, the base film BF may include (or may be made of) polyethersulfone (PES), polyacrylate (PAC), polyarylate (PAR), polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (CTA), cellulose acetate propionate (CAP), or a combination thereof. The base film BF may be a flexible substrate which is bendable, foldable, and/or rollable.

The thin-film transistor layer TFTL may be disposed above the base film BF. The thin-film transistor layer TFTL may include at least one thin-film transistor for driving each of a plurality of sub-pixels. At least one thin-film transistor of the sub-pixel may include a semiconductor layer, a gate electrode, a drain electrode, and a source electrode. For example, the thin-film transistor layer TFTL may further include scan lines, data lines, power supply lines, scan control lines, pads joined to the at least one thin-film transistor of the sub-pixel, and routing lines for connecting the data lines.

The light emission layer EML may be disposed above the thin-film transistor layer TFTL. The light emission layer EML may include a light emitting element connected to (e.g., joined to) at least one thin-film transistor of the thin-film transistor layer TFTL. The light emitting element may include a first electrode, a light emission layer, and a second electrode. For example, the light emission layer may be an organic light emission layer including (or made of) an organic material, but the present invention is not limited thereto. In an embodiment in which the light emission layer is an organic light emission layer, a thin-film transistor of the thin-film transistor layer TFTL applies a voltage (e.g., a predetermined voltage) to the first electrode of the light emitting element. When the second electrode of the light emitting element receives a common voltage or a cathode voltage, holes and electrons may move to the organic light emission layer respectively through a hole transport layer and an electron transport layer and may combine with each other to emit light at the organic light emission layer.

The light emission layer EML may include a pixel definition film that defines the plurality of sub-pixels. Portions of the light emission layer and corresponding ones of the first electrodes may be spaced and insulated from each other ones thereof by the pixel definition film.

The thin-film encapsulation layer TFEL may be disposed above the light emission layer EML to cover the thin-film transistor layer TFTL and the light emission layer EML. The thin-film encapsulation layer TFEL can prevent (or substantially prevent) oxygen and moisture from penetrating into the light emission layer EML. For example, the thin-film encapsulation layer TFEL may include at least one inorganic film. The thin-film encapsulation layer TFEL may include an inorganic film, such as a silicon nitride layer, a silicon oxynitride layer, a silicon oxide layer, a titanium oxide layer, and/or an aluminum oxide layer, but the present invention is not limited thereto.

The thin-film encapsulation layer TFEL may also protect the light emission layer EML from foreign substances, such as dust. For example, the thin-film encapsulation layer TFEL may include (or may also include) at least one organic film. The thin-film encapsulation layer TFEL may include an organic film, such as an acrylic resin, an epoxy resin, a phenolic resin, a polyamide resin, or a polyimide resin, but the present invention is not limited thereto.

The first cover window 120 may be disposed above the thin-film encapsulation layer TFEL. The first cover window 120 can protect the first display panel 110 by covering an upper surface of the thin-film encapsulation layer TFEL.

The first force sensor 130 may be disposed below the base film BF. The first force sensor 130 may include a first substrate SUB1, a driving electrode layer TEL, a pressure sensing layer PSL, a sensing electrode layer REL, and a second substrate SUB2.

The first substrate SUB1 and the second substrate SUB2 may face each other with the driving electrode layer TEL, the pressure sensing layer PSL, and the sensing electrode layer REL interposed therebetween. For example, each of the first substrate SUB1 and the second substrate SUB2 may include (or may be made of) polyethersulfone (PES), polyacrylate (PAC), polyarylate (PAR), polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (CTA), cellulose acetate propionate (CAP), or a combination thereof.

The driving electrode layer TEL may be disposed on the first substrate SUB1. The driving electrode layer TEL may include a plurality of driving electrodes. Each of the plurality of driving electrodes may be connected to (e.g., joined to) a touch driver through a driving line to receive a touch driving voltage from the touch driver.

The sensing electrode layer REL may be disposed on the second substrate SUB2. The sensing electrode layer REL may face the driving electrode layer TEL with the pressure sensing layer PSL interposed therebetween. The sensing electrode layer REL may include a plurality of sensing electrodes. Each of the plurality of sensing electrodes may be connected to (e.g., joined to) the touch driver through a sensing line to supply a touch input signal to the touch driver.

Each of a plurality of touch cells, formed by (e.g., composed of) the plurality of driving electrodes of the driving electrode layer TEL, the pressure sensing layer PSL, and the plurality of sensing electrodes of the sensing electrode layer REL, may experience (or undergo) a change in resistance value depending on an applied pressure. For example, the resistance value of one of the plurality of touch cells may decrease as pressure applied to the one of the plurality of touch cells increases. When the pressure applied to one of the plurality of touch cells is relatively low, the change in the resistance value of the corresponding touch cell may be insignificant. The touch driver may sense a change in current value or voltage value of a touch input signal by using a change in resistance value of each of the plurality of touch cells connected to the sensing line. Accordingly, the touch driver can sense a pressing pressure applied by a user's hand, and thus, the first force sensor 130 may be used as an input device that senses the user's touch input.

The pressure sensing layer PSL may be disposed between the driving electrode layer TEL and the sensing electrode layer REL. The pressure sensing layer PSL may form a plurality of touch cells by overlapping the plurality of driving electrodes and the plurality of sensing electrodes.

The pressure sensing layer PSL may include a polymer resin including (or containing) a pressure-sensitive material. The pressure-sensitive material may include fine metal particles (or metal nanoparticles), such as nickel (Ni), aluminum (Al), titanium (Ti), tin (Sn), and copper (Cu). For example, the pressure sensing layer PSL may be a quantum tunneling composite (QTC).

The first display unit 100 may further include an adhesive layer PSA that bonds the first display panel 110 and the first force sensor 130. The adhesive layer PSA may be disposed between a lower portion of the base film BF and an upper portion of the second substrate SUB2. For example, the adhesive layer PSA may be an optically clear adhesive film (OCA) or an optically clear resin (OCR).

Figure 6:
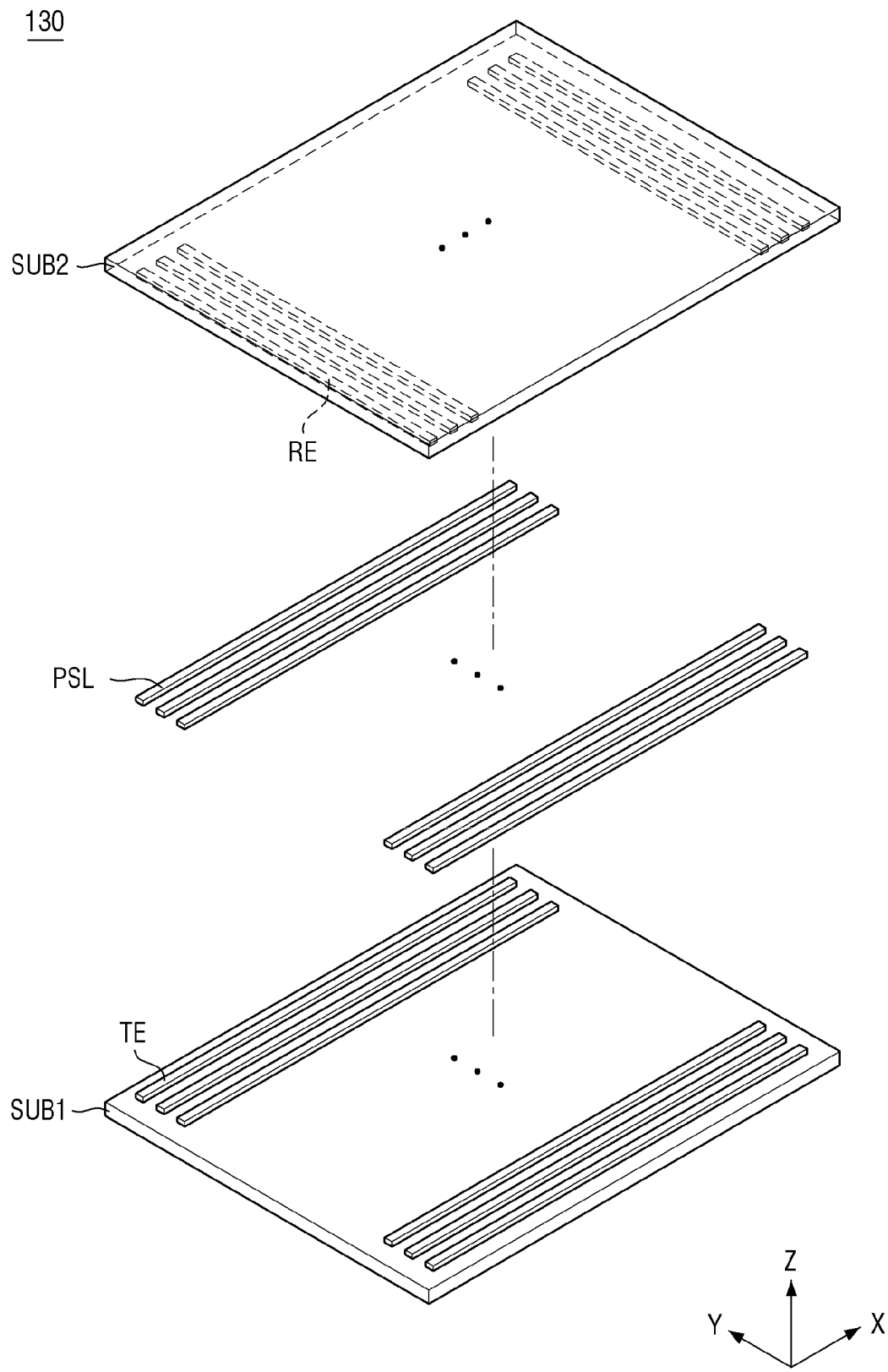
FIG. 6 is an exploded perspective view of a first force sensor of a display device according to an embodiment.

FIG. 6 is an exploded perspective view of the first force sensor 130 according to an embodiment. Here, the first force sensor 130 and the second force sensor 230 may have substantially the same configuration. The configuration of the first force sensor 130 will be described in detail, and the description of the configuration of the second force sensor 230 will be omitted as being substantially similar to that of the first force sensor 130.

Referring to FIG. 6, the first force sensor 130 may include a first substrate SUB1, a plurality of driving electrodes TE, a pressure sensing layer PSL, a plurality of sensing electrodes RE, and a second substrate SUB2.

The plurality of driving electrodes TE may be disposed on the first substrate SUB1. The plurality of driving electrodes TE may extend in the first direction (the x-axis direction) and may be spaced apart from each other in the second direction (the y-axis direction) crossing (e.g., perpendicular to) the first direction (the x-axis direction). The plurality of driving electrodes TE may be connected to a touch driver through a driving line to receive a touch driving voltage from the touch driver. For example, the plurality of driving electrodes TE may include a conductive material, such as silver (Ag) and/or copper (Cu). The plurality of driving electrodes TE may be formed on the first substrate SUB1 in a screen printing manner, but the present invention is not limited thereto.

The pressure sensing layer PSL may be formed on the plurality of driving electrodes TE. The pressure sensing layer PSL may be patterned along (e.g., may be patterned to correspond to) the arrangement of the plurality of driving electrodes TE. A plurality of patterns of the pressure sensing layer PSL may extend in the first direction (the x-axis direction) and may be spaced apart from each other in the second direction (the y-axis direction) crossing (e.g., perpendicular to) the first direction (the x-axis direction). Accordingly, the plurality of patterns of the pressure sensing layer PSL may cross the plurality of sensing electrodes RE.

The pressure sensing layer PSL may be disposed between the plurality of driving electrodes TE and the plurality of sensing electrodes RE. The pressure sensing layer PSL may form a plurality of touch cells by overlapping the plurality of driving electrodes TE and the plurality of sensing electrodes RE.

The plurality of touch cells may correspond to areas where the pressure sensing layer PSL overlaps the plurality of driving electrodes TE and the plurality of sensing electrodes RE (e.g., ones of the touch cells may be formed at where the pressure sensing layer PSL overlaps one of the driving electrodes TE and one of the sensing electrodes RE). Each of the plurality of touch cells may have a resistance value that changes depending on an applied pressure. For example, the resistance value of one of the plurality of touch cells may decrease as pressure applied to the one of the plurality of touch cells increases. When the pressure applied to one of the plurality of touch cells is relatively low, the change in the resistance value of the touch cell may be insignificant. The touch driver may sense a change in current value or voltage value of a touch input signal by using a change in resistance value of each of the plurality of touch cells connected to the sensing line. Accordingly, the touch driver is configured to sense a pressing pressure applied by a user's hand, and thus, the first force sensor 130 may be used as an input device that senses the user's touch input.

The pressure sensing layer PSL may include a polymer resin including (or containing) a pressure-sensitive material. The pressure-sensitive material may include fine metal particles (or metal nanoparticles), such as nickel (Ni), aluminum (Al), titanium (Ti), tin (Sn), and copper (Cu). For example, the pressure sensing layer PSL may be a quantum tunneling composite (QTC).

The plurality of sensing electrodes RE may be disposed on the second substrate SUB2. The plurality of sensing electrodes RE may extend in the second direction (the y-axis direction) and may be spaced apart from each other in the first direction (the x-axis direction). The plurality of sensing electrodes RE may cross the plurality of driving electrodes TE. The second substrate SUB2 at where the plurality of sensing electrodes RE are formed may be bonded to the first substrate SUB1 at where the plurality of driving electrodes TE and the pressure sensing layer PSL are formed using an adhesive member.

The first substrate SUB1 and the second substrate SUB2 may be bonded to each other by an adhesive member. The adhesive member may fill a gap between the first substrate SUB1 and the second substrate SUB2. The adhesive member may insulate each of the plurality of driving electrodes TE from each of the plurality of sensing electrodes RE and may prevent (or substantially reduce) the plurality of driving electrodes TE and the plurality of sensing electrodes RE from being exposed to the outside and, thus, oxidizing. The adhesive member may prevent (or substantially reduce) the plurality of driving electrodes TE and the plurality of sensing electrodes RE from coming in direct contact with each other even when the first force sensor 130 receives (or is subjected to) an external pressure.

Figure 7:
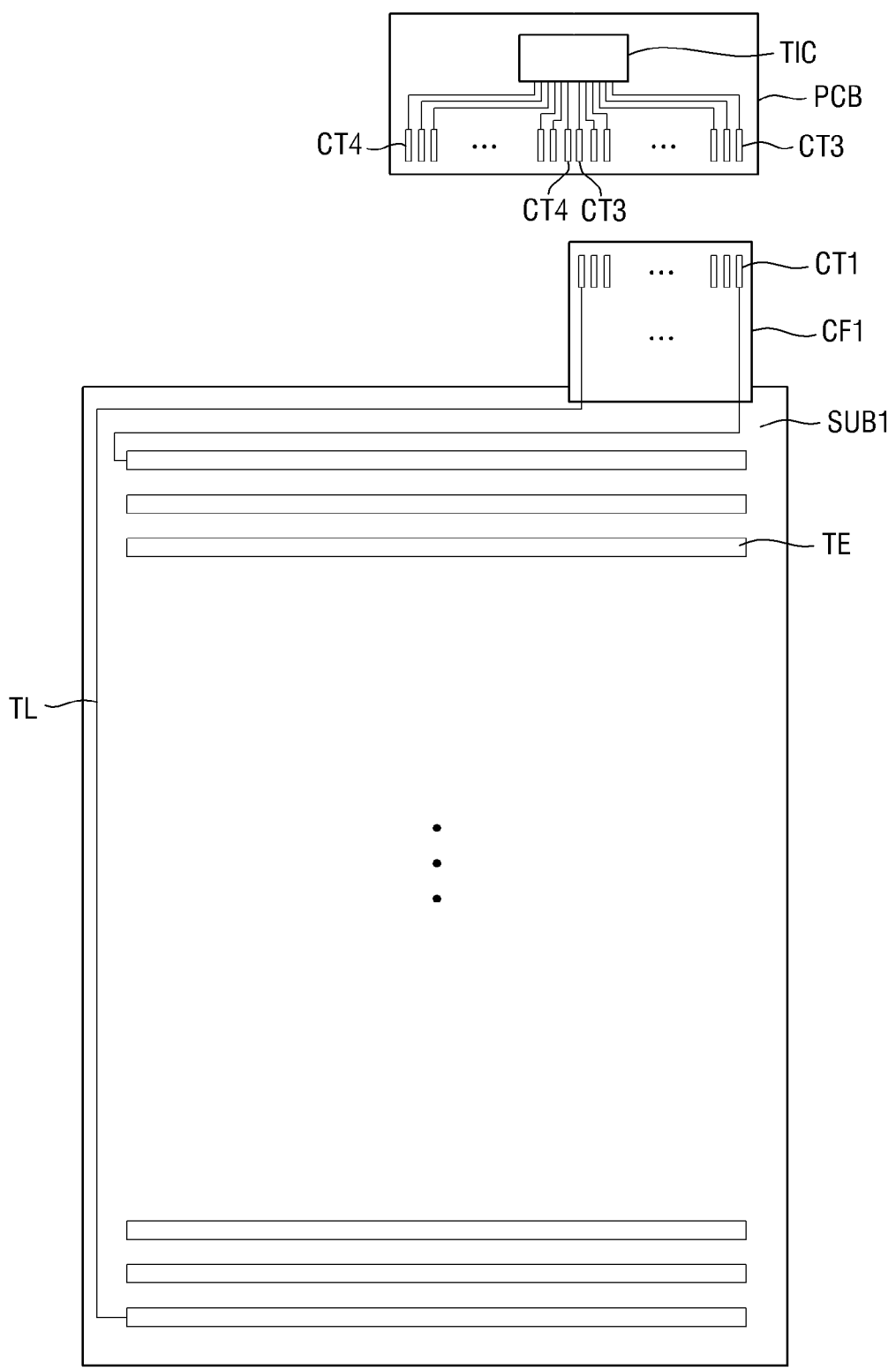
FIG. 7 is a plan view showing a printed circuit board and a first substrate of a display device according to an embodiment.
Figure 8:
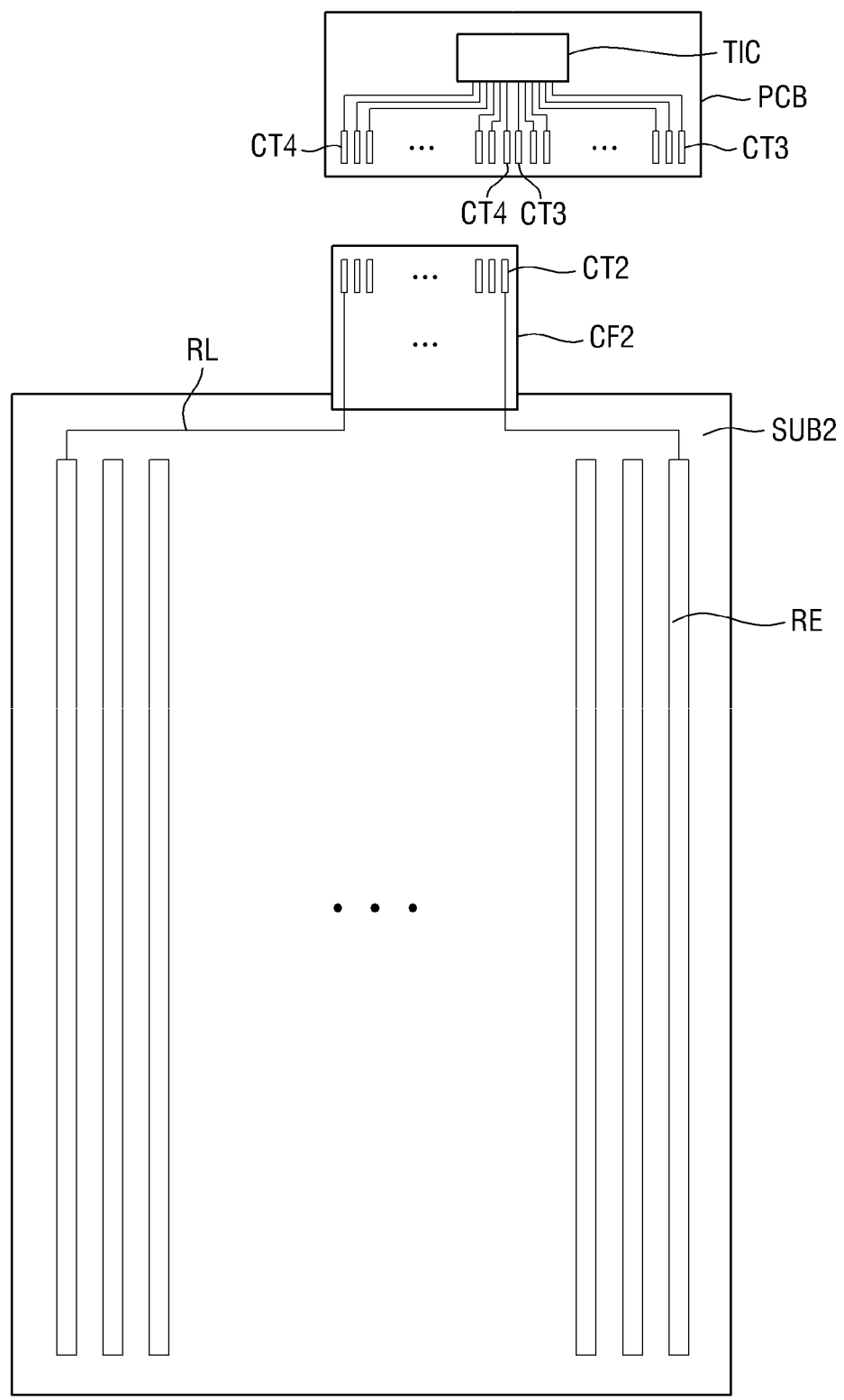
FIG. 8 is a plan view showing the printed circuit board shown in FIG. 7 and a second substrate of a display device according to an embodiment.
Figure 9:
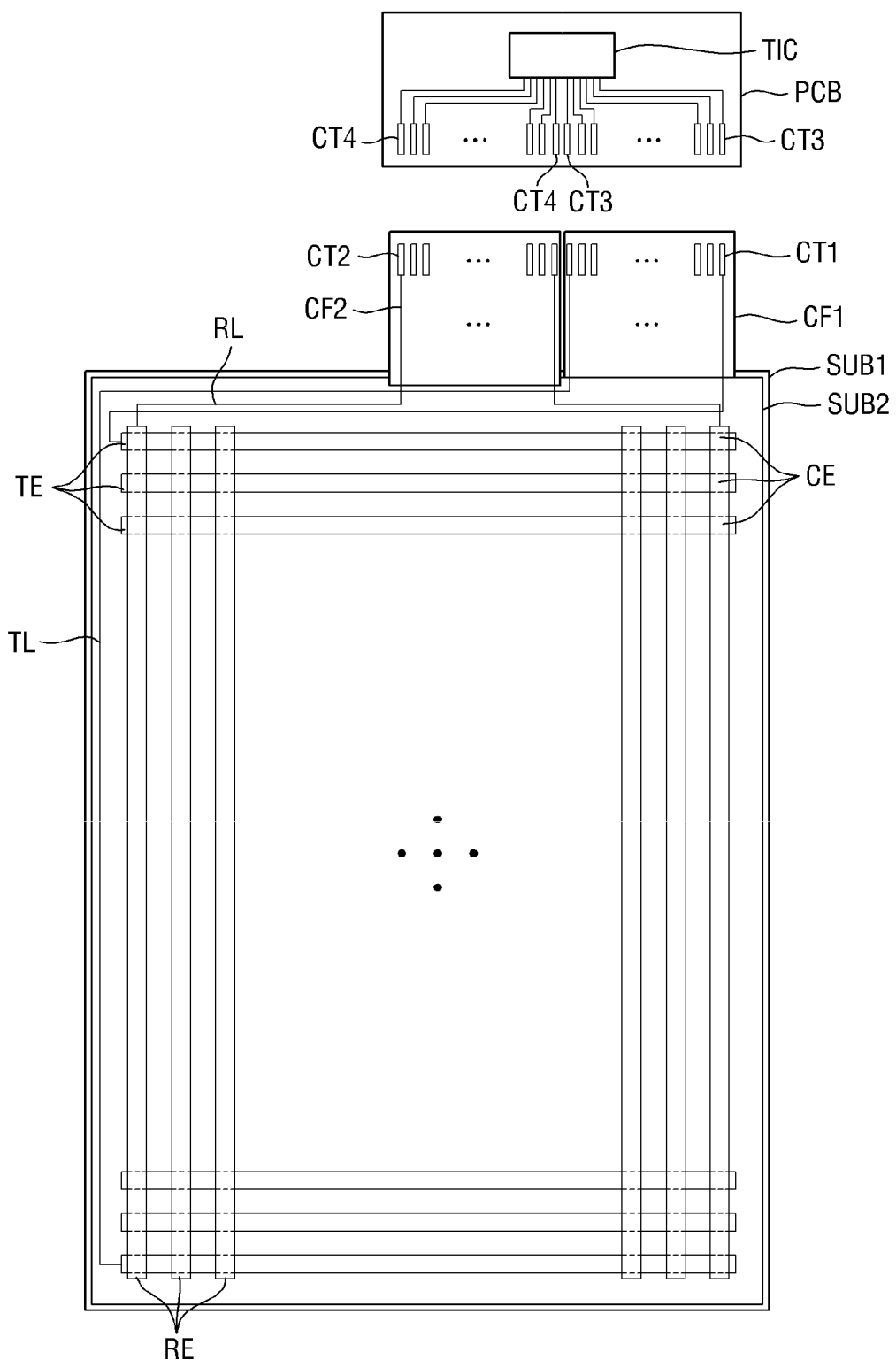
FIG. 9 is a plan view showing the first substrate shown in FIG. 7 and the second substrate shown in FIG. 8 bonded to each other according to an embodiment.

FIG. 7 is a plan view showing a printed circuit board and a first substrate of a display device according to an embodiment, FIG. 8 is a plan view showing the printed circuit board shown in FIG. 7 and a second substrate of a display device according to an embodiment, and FIG. 9 is a plan view showing the first substrate and the second substrate of the display device shown in FIGS. 7 and 8 bonded to each other according to an embodiment.

Referring to FIGS. 7 to 9, the first force sensor 130 may further include a touch driver TIC which drives the first force sensor 130 and a printed circuit board PCB on which the touch driver TIC is mounted.

The touch driver TIC may be disposed on the printed circuit board PCB and may measure a change in resistance of a plurality of touch cells CE. The plurality of touch cells CE may be formed in areas where the pressure sensing layer PSL overlaps the plurality of driving electrodes TE and the plurality of sensing electrodes RE. For example, the plurality of touch cells CE may be spaced apart from each other in the second direction (the y-axis direction) along an arrangement interval of the plurality of driving electrodes TE and may be spaced apart from each other in the first direction (the x-axis direction) along an arrangement interval of the plurality of sensing electrodes RE.

The touch driver TIC may detect the position and pressure magnitude of a user's touch on the basis of the change in resistance of the plurality of touch cells CE. Here, the user's touch refers to an object, such as a user's finger or a pen being brought into direct contact with the surface of the first display unit 100. Also, the touch driver TIC may classify a plurality of touch inputs into user-intended touch inputs and user-unintended touch inputs and remove noise and, thus, may precisely detect a user's touch input.

The printed circuit board PCB may be connected to (e.g., joined to) the first substrate SUB1 through a first circuit film CF1 and may be connected to (e.g., joined to) the second substrate SUB2 through a second circuit film CF2. A third connection terminal CT3 of the printed circuit board PCB may be connected to a first connection terminal CT1 of the first circuit film CF1, and a fourth connection terminal CT4 of the printed circuit board PCB may be connected to a second connection terminal CT2 of the second circuit film CF2. For example, the printed circuit board PCB may be a flexible printed circuit board (FPCB), a printed circuit board (PCB), or a flexible film, such as a chip-on-film (COF).

The touch driver TIC may be connected to (e.g., joined to) the third connection terminal CT3 or the fourth connection terminal CT4 of the printed circuit board PCB through lead lines of the printed circuit board PCB.

In FIG. 7, the touch driver TIC may be connected to (e.g., joined to) the third connection terminal CT3 of the printed circuit board PCB through a lead line, and the first connection terminal CT1 of the first circuit film CF1 may be connected to (e.g., joined to) the plurality of driving electrodes TE on the first substrate SUB1 through a driving line TL. Accordingly, the touch driver TIC may be electrically connected to the plurality of driving electrodes TE through the lead line, the third connection terminal CT3, the first connection terminal CT1, and the driving line TL. For example, each of the plurality of driving electrodes TE may have an end connected to (e.g., joined to) the driving line TL on the left side of the first substrate SUB1. The plurality of driving electrodes TE may extend in parallel along the first direction (the x-axis direction).

In FIG. 8, the touch driver TIC may be connected to (e.g., joined to) the fourth connection terminal CT4 of the printed circuit board PCB through a lead line, and the second connection terminal CT2 of the second circuit film CF2 may be connected to (e.g., joined to) the plurality of sensing electrodes RE on the second substrate SUB2 through a sensing line RL. Accordingly, the touch driver TIC may be electrically connected to the plurality of sensing electrodes RE through the lead line, the fourth connection terminal CT4, the second connection terminal CT2, and the sensing line RL. For example, each of the plurality of sensing electrodes RE may have an end connected to (e.g., joined to) the sensing line RL on the upper side of the second substrate SUB2. The plurality of sensing electrodes RE may extend in parallel along the direction opposite to the second direction (the y-axis direction).

In FIG. 9, the driving line TL may be formed on the first substrate SUB1 to connect (e.g., join) the plurality of driving electrodes TE to the first connection terminal CT1 of the first circuit film CF1, and the sensing line RL may be formed on the second substrate SUB2 to connect (e.g., join) the plurality of sensing electrodes RE to the second connection terminal CT2 of the second circuit film CF2. The driving line TL and the sensing line RL may be insulated from each other by an adhesive member disposed between the first substrate SUB1 and the second substrate SUB2.

Figure 10:
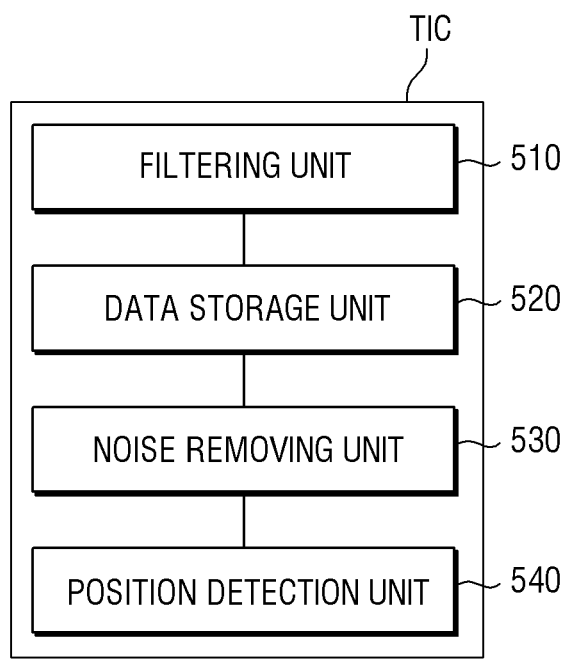
FIG. 10 is a diagram of a touch driver of a display device according to an embodiment.
Figure 11:
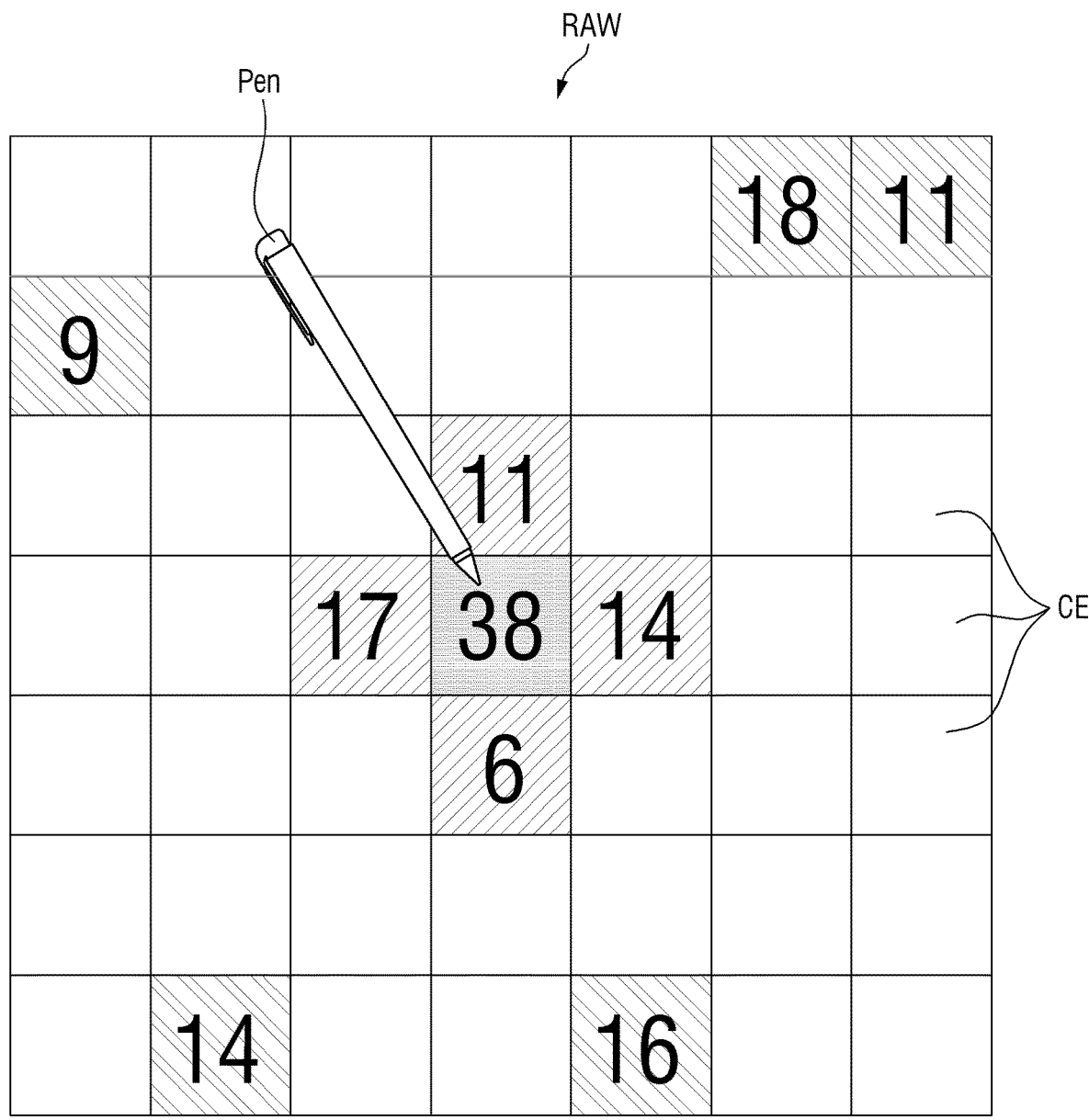
FIG. 11 is a diagram showing raw data generated in a plurality of touch cells in a display device according to an embodiment.
Figure 12:
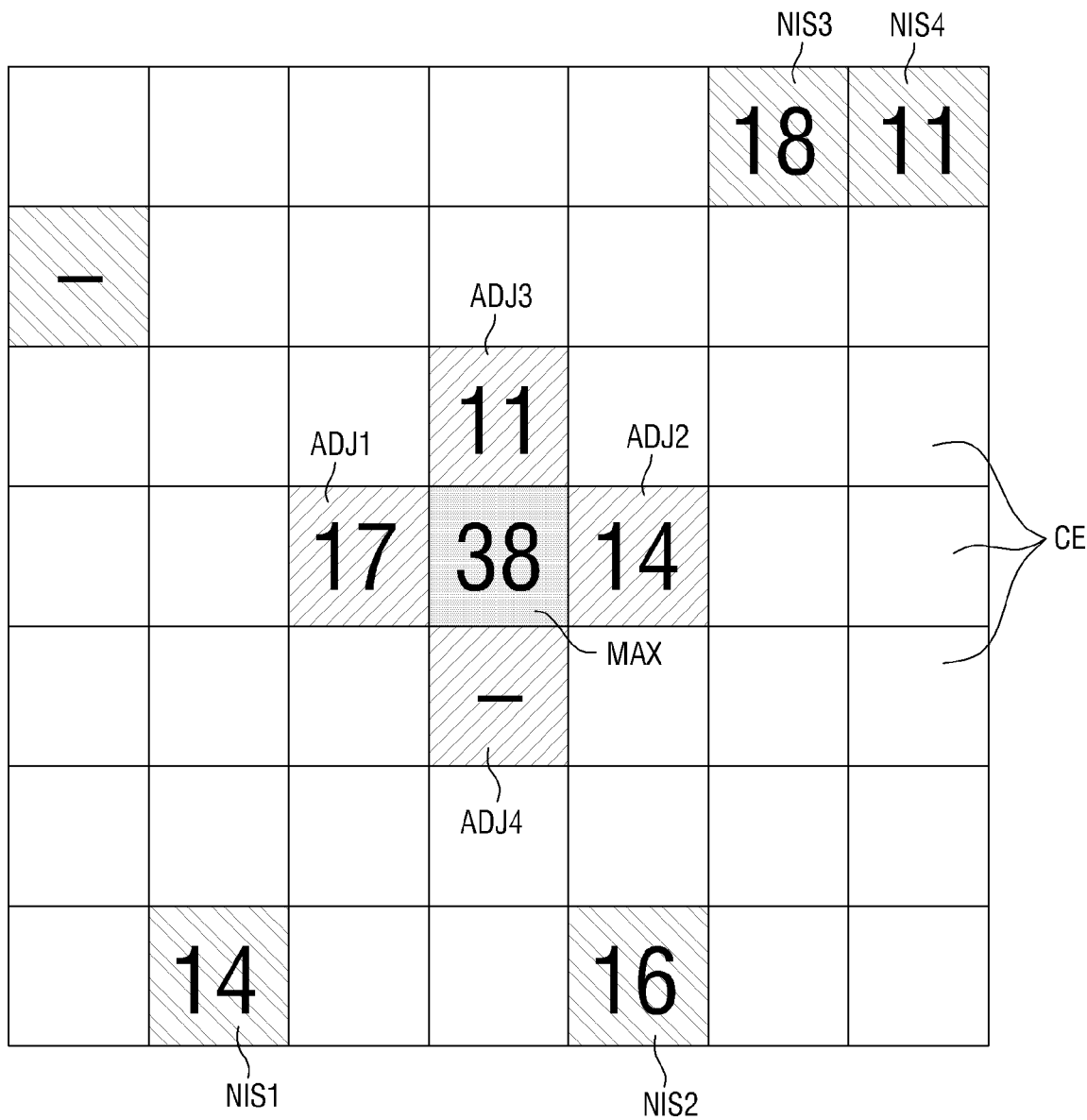
FIG. 12 is a diagram showing sensing data from FIG. 11 that has passed through a filtering unit in a display device according to an embodiment.
Figure 13:
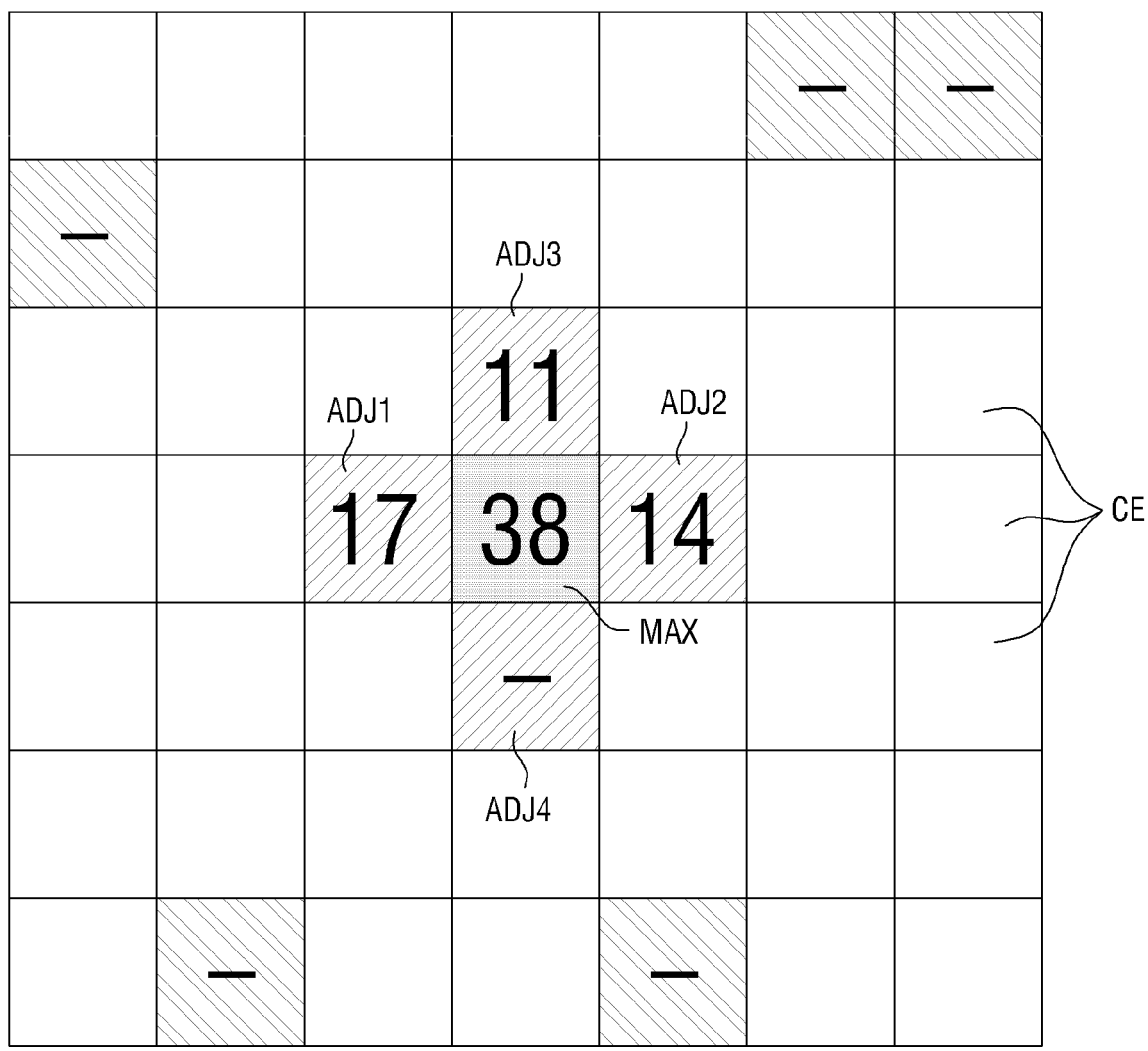
FIG. 13 is a diagram showing storage data stored in a data storage unit from among the sensing date shown in FIG. 12 in a display device according to an embodiment.
Figure 14:
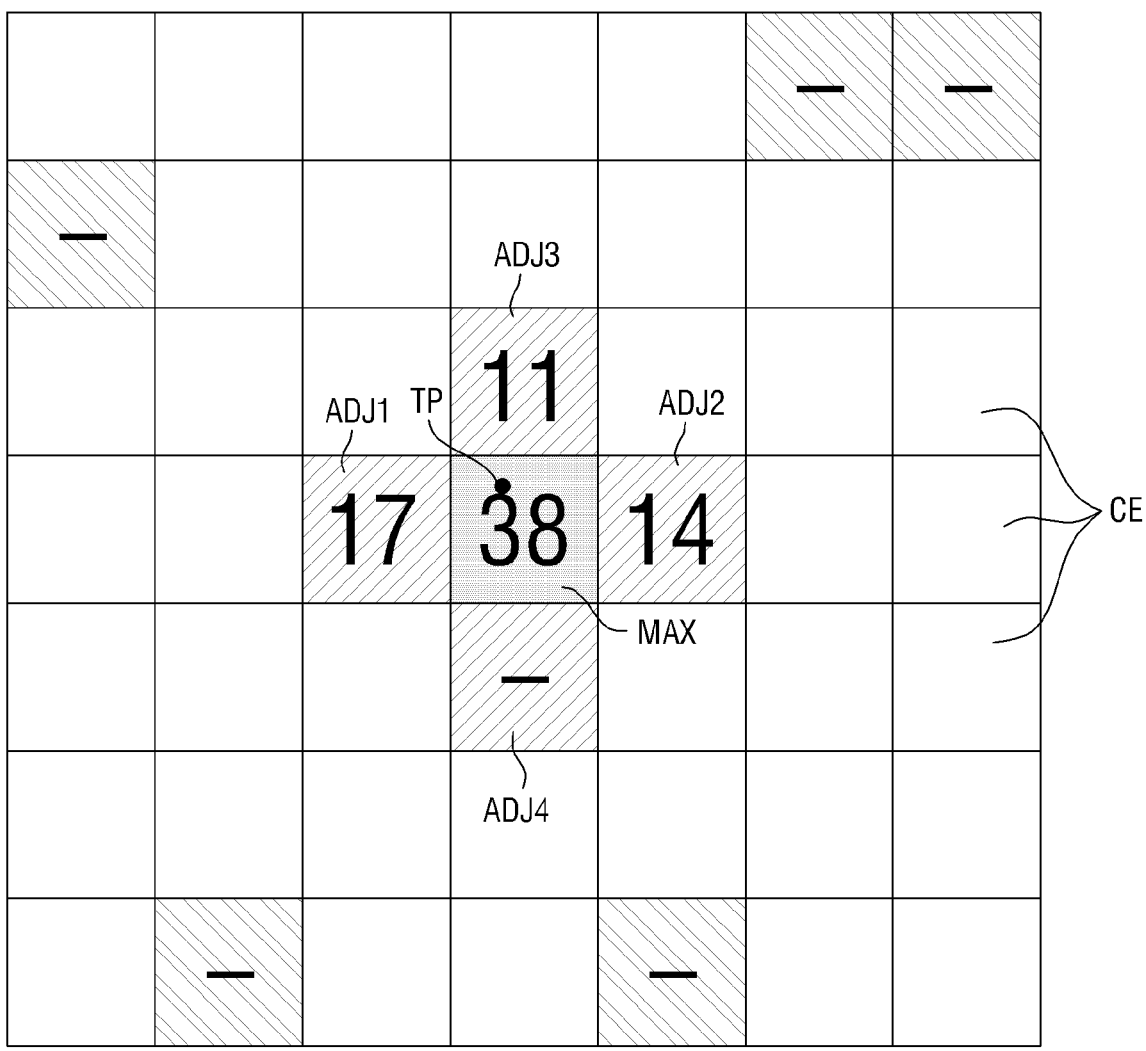
FIG. 14 is a diagram showing a touch position detected by a position detection unit in a display device according to an embodiment.

FIG. 10 is a diagram showing a touch driver of a display device according to an embodiment. FIG. 11 is a diagram showing a plurality of pieces of raw data generated by a plurality of touch cells in a display device according to an embodiment, and FIG. 12 is a diagram showing a plurality of pieces of sensing data that have passed through a filtering unit in a display device according to an embodiment. FIG. 13 is a diagram showing storage data stored in a data storage unit in a display device according to an embodiment, and FIG. 14 is a diagram showing a touch position detected by a position detection unit in a display device according to an embodiment. Data values of the plurality of touch cells shown in FIGS. 11 to 14 are for convenience of description, and thus, the configuration and effect of the present disclosure are not limited to these example data values of the touch cells.

Referring to FIGS. 10 to 14, the touch driver TIC may include a filtering unit 510, a data storage unit 520, a noise removing unit 530, and a position detection unit 540.

The filtering unit 510 may filter a plurality of pieces of raw data RAW and then output a plurality of pieces of sensing data SE. The filtering unit 510 may receive the plurality of pieces of raw data RAW from a plurality of touch cells CE through one or more sensing lines RL. For example, the filtering unit 510 may correspond to a low noise filter that filters out relatively low data (e.g., low value data) from the plurality of pieces of raw data RAW. The filtering unit 510 may remove some noise from the plurality of pieces of raw data RAW. Accordingly, the filtering unit 510 may remove relatively low data or some noise from the plurality of pieces of raw data RAW and may output a plurality of pieces of sensing data SE including relatively high pieces of data (e.g., high value data).

In FIGS. 11 and 12, among the plurality of pieces of data RAW, the filtering unit 510 may pass raw data exceeding 10 and remove raw data less than or equal to 10 (e.g., in some embodiments, low data may be defined as 10 or less, but the present invention is not limited thereto). Accordingly, the plurality of pieces of sensing data SE may be composed of pieces of data exceeding 10 as one example.

In FIG. 13, the data storage unit 520 may store storage data SD including touch position information and/or touch pressure information. The storage data SD may include max data and propagation data. For example, the data storage unit 520 may store max data of a max touch cell MAX and propagation data of at least one adjacent touch cell ADJ from among the plurality of pieces of sensing data SE. The storage data SD stored in the data storage unit 520 may be protected from (e.g., may not be passed to) the noise removing unit 530. The max data and the propagation data may not be removed by the noise removing unit 430 irrespective of data size. Accordingly, the data storage unit 520 may store the storage data SD including the touch position information and/or the touch pressure information and exclude (e.g., protect) the storage data SD from targets from which noise will be removed.

The max data of the max touch cell MAX may have the highest value from among data of the plurality of touch cells CE. For example, the max touch cell MAX may correspond to a touch cell CE touched with a user's finger or pen. In a low-resolution force sensor, the size of an area touched by a user may be smaller than the size of each of the plurality of touch cells CE. Accordingly, the area touched by the user may correspond to a portion of the max touch cell MAX.

The at least one adjacent touch cell ADJ may be directly adjacent to the max touch cell MAX. A plurality of adjacent touch cells ADJ may surround the max touch cell MAX. For example, first to fourth adjacent touch cells ADJ1, ADJ2, ADJ3, and ADJ4 may be adjacent to left, right, upper, and lower sides of the max touch cell MAX, respectively, when viewed from the top. In FIG. 12, the first adjacent touch cell ADJ1 may be disposed to the left of the max touch cell MAX, the second adjacent touch cell ADJ2 may be disposed to the right of the max touch cell MAX, the third adjacent touch cell ADJ3 may be disposed above the max touch cell MAX, and the fourth adjacent touch cell ADJ4 may be disposed below the max touch cell MAX. However, the arrangement of the plurality of adjacent touch cells ADJ is not limited to the configuration shown in FIG. 12, and the design of the arrangement may be flexibly changed depending on the configuration and arrangement of the plurality of touch cells CE.

The max touch cell MAX may have max data proportional to the magnitude of the touch pressure, and the plurality of adjacent touch cells ADJ may have propagation data generated when the touch pressure generated in the max touch cell MAX is propagated. The size of the propagation data of the adjacent touch cell ADJ may be determined depending on the size of the max data and the distance between the touch position and the corresponding adjacent touch cell ADJ. For example, the size of the propagation data may increase as the size of the max data increases, and the size of the propagation data of the corresponding adjacent touch cell ADJ may increase as the touch position nears the corresponding adjacent touch cell ADJ.

In FIGS. 11 and 12, because the touch position of the pen is nearer to the first adjacent touch cell ADJ1 than to the second adjacent touch cell ADJ2, the size (17) of the propagation data of the first adjacent touch cell ADJ1 may be greater than the size (14) of the propagation data of the second adjacent touch cell ADJ2. Also, because the touch position of the pen is nearer to the third adjacent touch cell ADJ3 than to the fourth adjacent touch cell ADJ4, the size (11) of the propagation data of the third adjacent touch cell ADJ3 may be greater than the size (6) of the propagation data of the fourth adjacent touch cell ADJ4.

In FIGS. 12 and 13, the noise removing unit 530 may detect and remove noise NIS from the plurality of pieces of sensing data SE. For example, the noise removing unit 530 may determine that data of the touch cell CE spaced a distance from the max touch cell MAX is noise. The noise removing unit 530 may determine that data of a touch cell CE not directly adjacent to the max touch cell MAX is noise. In FIG. 12, first to fourth noises NIS1, NIS2, NIS3, and NIS4 are not be directly adjacent to the max touch cell MAX (e.g., the first to fourth noises NIS1, NIS2, NIS3, and NIS4 correspond to touch cells CE spaced apart from the max touch cell MAX by one or more intervening touch cells CE). Accordingly, the noise removing unit 530 may remove the first to fourth noises NIS1, NIS2, NIS3, and NIS4 spaced a distance from the max touch cell MAX.

The noise removing unit 530 may determine that data of a touch cell having no adjacent touch cells from among the plurality of touch cells CE having the plurality of pieces of sensing data SE is noise. In FIG. 12, the first and second noises NIS1 and NIS2 may not have adjacent touch cells (e.g., may not have adjacent touch cells registering a touch or pressure). Because the first and second noises NIS1 and NS2 do not have adjacent touch cells, the noise removing unit 530 may determine that the first and second noises NIS1 and NIS2 are not data generated by a user's touch input.

The noise removing unit 530 may determine that data not stored by the data storage unit 520 from among the plurality of pieces of sensing data SE is noise and may remove the noise. Accordingly, the noise removing unit 530 may remove data not including the touch position information and/or the touch pressure information by removing data other than the max data and the propagation data stored in the data storage unit 520.

The filtering unit 510, which is a low noise filter, may remove some noise of the plurality of pieces of raw data RAW. The noise removing unit 530 may remove other noise not removed by the filtering unit 510. Accordingly, the touch driver TIC may accurately detect and remove noise other than data caused by a touch input and, thus, may improve the quality (e.g., the accuracy) of the force sensor.

The position detection unit 540 may detect a touch position TP where a touch pressure is generated on the basis of the position of the max touch cell MAX, the value of the max data, the position of the at least one adjacent touch cell ADJ, and the value of the propagation data.

For example, when one adjacent touch cell ADJ is adjacent to the max touch cell MAX, the position detection unit 540 may calculate the touch position by using Equation 1 below.

$$x = \frac{d1 \times x1 + d2 \times x2}{d1 + d2} \quad \text{[Equation 1]}$$

wherein "x" is a touch position, "d1" is a max data value, "d2" is a propagation data value, "x1" is the position of a max touch cell MAX, and "x2" is the position of an adjacent touch cell ADJ.

When one adjacent touch cell ADJ is adjacent to the max touch cell MAX, the position detection unit 540 may detect an area of the max touch cell MAX adjacent to the adjacent touch cell ADJ as the touch position caused by the touch pressure. For example, as the propagation data value of the adjacent touch cell ADJ increases, the touch position may be nearer to an interface between the max touch cell MAX and the adjacent touch cell ADJ. As another example, as the propagation data value of the adjacent touch cell ADJ decreases, the touch position may become closer to a central area of the max touch cell MAX.

In FIG. 14, when a plurality of adjacent touch cells ADJ are adjacent to the max touch cell MAX, the position detection unit 540 may calculate the touch position TP by using Equation 2 below.

$$x = \frac{d1 \times x1 + d2 \times x2 + \cdots + dn \times xn}{d1 + d2 + \cdots + dn} \quad \text{[Equation 2]}$$

wherein "x" is a touch position, "d1" is a max data value, "d2" is a first propagation data value, "dn" is an (n−1)th propagation data value, "x1" is the position of a max touch cell MAX, "x2" is the position of a first adjacent touch cell ADJ1, and "xn" is the position of an (n−1)th adjacent touch cell.

When a plurality of adjacent touch cells ADJ are adjacent to the max touch cell MAX, the position detection unit 540 may detect a partial area of the max touch cell MAX close to an adjacent touch cell having the highest propagation data value from among the plurality of adjacent touch cells ADJ as the touch position TP. For example, when the first propagation data value of the first adjacent touch cell ADJ1 is greater than the second propagation data value of the second adjacent touch cell ADJ2, the touch position TP may correspond to an area of the max touch cell MAX closer to the first adjacent touch cell ADJ1. As another example, when the first propagation data value of the first adjacent touch cell ADJ1 is greater than the second to fourth propagation data values of the second to fourth adjacent touch cells ADJ2, ADJ3, and ADJ4, the touch position TP may correspond to an area of the max touch cell MAX closer to the first adjacent touch cell ADJ1.

In a low-resolution force sensor, the size of the touch position TP may be smaller than the size of the max touch cell MAX. The touch driver TIC may determine that the touch position TP corresponds to a partial area of the max touch cell MAX by using the position of the max touch cell MAX, the value of the max data, the position of the at least one adjacent touch cell ADJ, and the value of the propagation data. For example, the position detection unit 540 may precisely sense the touch position TP by using interpolation, such as by using Equation 1 or Equation 2 above. Accordingly, the display device according to the present disclosure may sense a precise touch position by using a low-cost, high-efficiency, and low-resolution force sensor.

Figure 15:
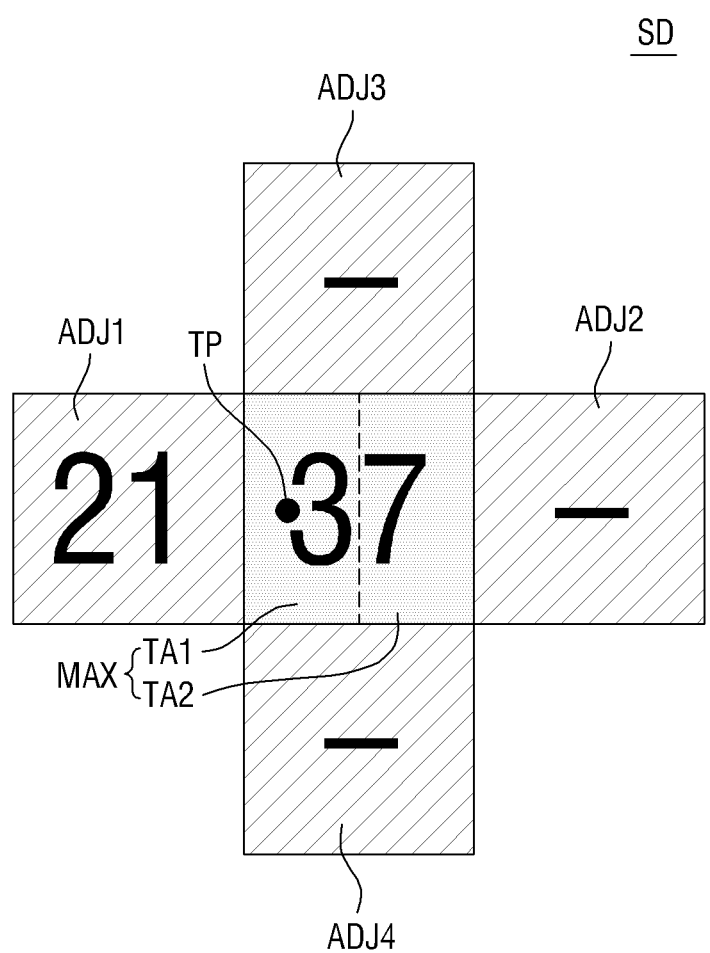
FIG. 15 is an example diagram illustrating a touch position detection method of a position detection unit in a display device according to an embodiment.

FIG. 15 is an example diagram illustrating a touch position detection method of a position detection unit in a display device according to an embodiment.

Referring to FIG. 15, the storage data SD may include max data (37) of the max touch cell MAX and first propagation data (21) of the first adjacent touch cell ADJ1. The position detection unit 540 may detect a touch position TP where a touch pressure is generated on the basis of the position of the max touch cell MAX, the value (37) of the max data, the position of the first adjacent touch cell ADJ1, and the value (21) of the first propagation data.

For example, when one adjacent touch cell ADJ is adjacent to the max touch cell MAX, the position detection unit 540 may calculate the touch position TP by using Equation 1 above. The max touch cell MAX may include a first area TA1 adjacent to the first adjacent touch cell ADJ1 and a second area TA2 not adjacent to the first adjacent touch cell ADJ1. For example, the size (21) of the propagation data may increase as the size (37) of max data increases, and the size (21) of the first propagation data of the first adjacent touch cell ADJ1 may increase as the touch position TP nears the first adjacent touch cell ADJ1. The position detection unit 540 may detect a portion of the first area TA1 of the max touch cell MAX as the touch position TP where the touch pressure is generated (or applied). Accordingly, the display device according to the present disclosure may sense a precise touch position by using a low-cost, high-efficiency, and low-resolution force sensor.

Figure 16:
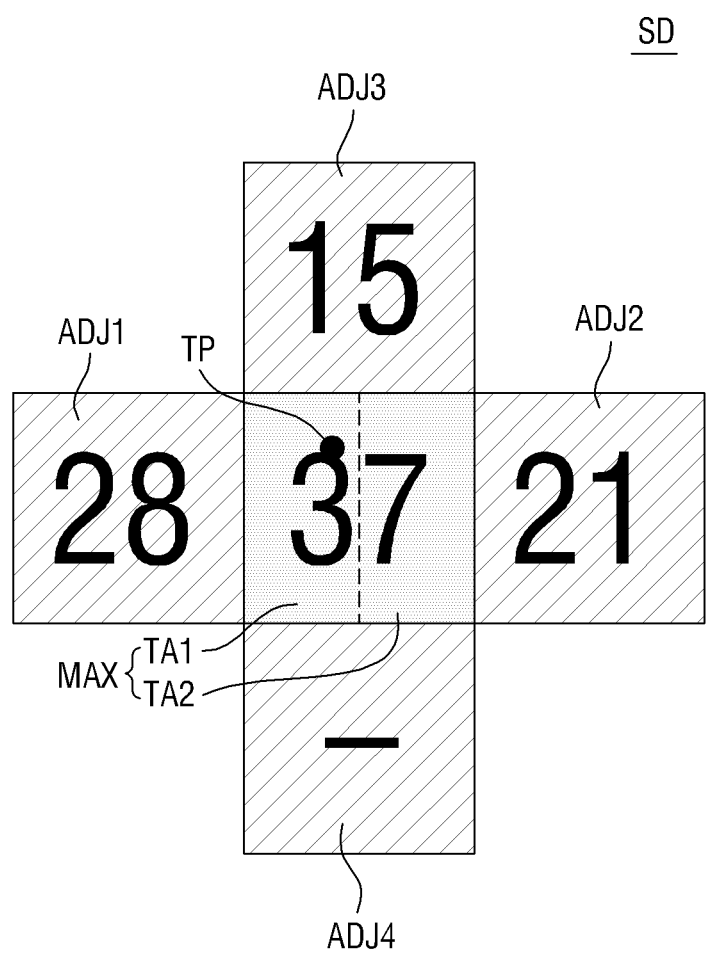
FIG. 16 is example diagram illustrating a touch position detection method of a position detection unit in a display device according to another embodiment.

FIG. 16 is another example diagram illustrating a touch position detection method of a position detection unit in a display device according to an embodiment.

Referring to FIG. 16, the storage data SD may include max data (37) of the max touch cell MAX and first to third pieces of propagation data (28, 21, and 15) of the first to third adjacent touch cells ADJ1, ADJ2, and ADJ3. The position detection unit 540 may detect a touch position TP where a touch pressure is generated on the basis of the position of the max touch cell MAX, the value (37) of the max data, the positions of the first to third adjacent touch cells ADJ1, ADJ2, and ADJ3, and the values (28, 21, and 15) of the first to third propagation data.

For example, when a plurality of adjacent touch cells ADJ are adjacent to the max touch cell MAX, the position detection unit 540 may calculate the touch position TP by using Equation 2 above. The max touch cell MAX may include a first area TA1 adjacent to the first adjacent touch cell ADJ1, which has the highest propagation data value from among the first to third adjacent touch cells ADJ1, ADJ2, and ADJ3, and a second area TA2 not adjacent to the first adjacent touch cell ADJ1. For example, the sizes (28, 21, and 15) of the first to third pieces of propagation data may increase as the size (37) of max data increases, and the size (28) of the first propagation data of the first adjacent touch cell ADJ1 may increase as the touch position TP nears the first adjacent touch cell ADJ1. As another example, the difference between the first propagation data value and the second propagation data value may increase as the touch position TP approaches the first adjacent touch cell ADJ1 and recedes from the second adjacent touch cell ADJ2. The position detection unit 540 may detect a portion of the first area TA1 of the max touch cell MAX as the touch position TP where the touch pressure is generated (or applied). Accordingly, the display device according to the present disclosure may sense a precise touch position by using a low-cost, high-efficiency, and low-resolution force sensor.

Figure 17:
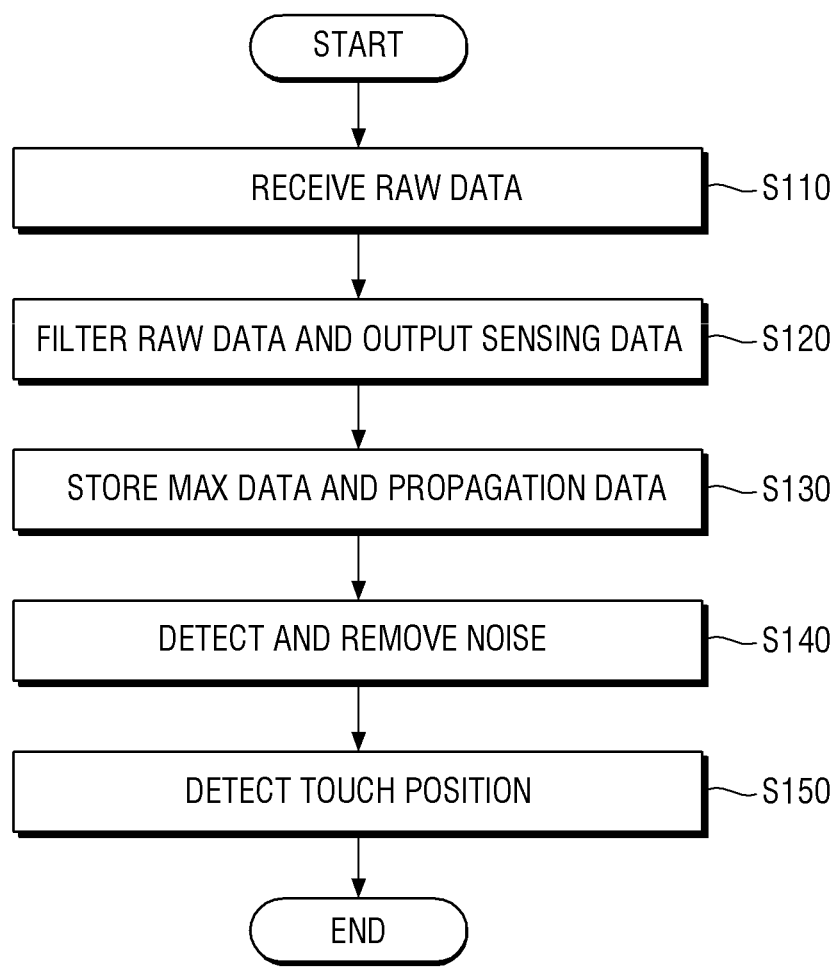
FIG. 17 is a flowchart illustrating a touch position detection process of a touch driver in a display device according to an embodiment.

FIG. 17 is a flowchart illustrating a touch position detection process of a touch driver in a display device according to an embodiment. Here, the above-described elements may be described briefly or omitted.

Referring to FIG. 17, the filtering unit 510 may receive a plurality of pieces of raw data RAW from a plurality of touch cells CE through one or more sensing lines RL (S110).

The filtering unit 510 may filter the plurality of pieces of raw data RAW and then output a plurality of pieces of sensing data SE (S120). For example, the filtering unit 510 may correspond to a low noise filter that filters out relatively low data (e.g., low value data) from the plurality of pieces of raw data RAW.

The data storage unit 520 may store max data of a max touch cell MAX and propagation data of at least one adjacent touch cell ADJ from among the plurality of pieces of sensing data SE (S130). The max data and at least one piece of propagation data stored in the data storage unit 520 may be protected from (e.g., excluded from) the noise removing unit 530.

The noise removing unit 530 may detect and remove noise NIS from the plurality of pieces of sensing data SE (S140). The max data and at least one piece of propagation data stored in the data storage unit 520 may be excluded from targets from which noise is removed.

The position detection unit 540 may detect a touch position TP where a touch pressure is generated (or applied) on the basis of the position of the max touch cell MAX, the value of the max data, the position of the at least one adjacent touch cell ADJ, and the value of the propagation data (S150). For example, the position detection unit 540 may precisely sense the touch position TP by using interpolation, such as by using Equation 1 or Equation 2 above.

Accordingly, the display device according to the present disclosure may sense a precise touch position by using a low-cost, high-efficiency, and low-resolution force sensor.

Figure 18:
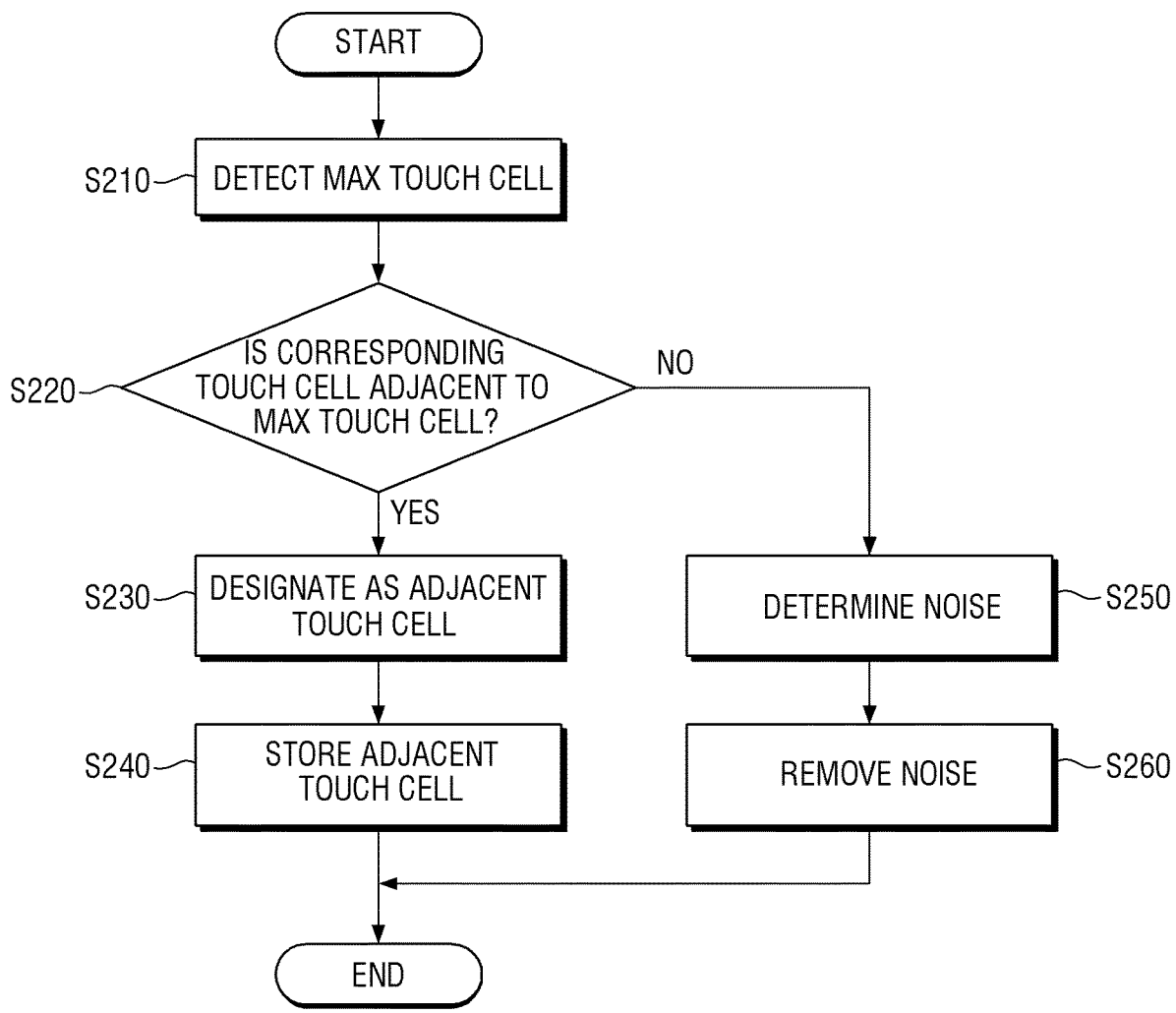
FIG. 18 is a flowchart illustrating a noise detection process of a touch driver in a display device according to an embodiment.

FIG. 18 is an example diagram illustrating a noise detection process of a touch driver in a display device according to an embodiment.

Referring to FIG. 18, the data storage unit 520 may detect a max touch cell MAX where a touch pressure is generated (or applied) from among a plurality of touch cells CE (S210). The max data of the max touch cell MAX may have the highest value from among a plurality of pieces of sensing data SE.

The touch driver TIC may determine whether or not a corresponding touch cell CE from among the plurality of touch cells CE is adjacent to the max touch cell MAX (S220).

When the corresponding touch cell CE is adjacent to the max touch cell MAX, the data storage unit 520 may designate the corresponding touch cell CE as an adjacent touch cell ADJ (S230).

The data storage unit 520 may store propagation data of the adjacent touch cell ADJ to protect the propagation data from the noise removing unit 530 (S240).

When the corresponding touch cell CE is not adjacent to the max touch cell MAX, the noise removing unit 530 may determine that the corresponding touch cell CE is noise NIS (S250). In FIG. 12, first to fourth noises NIS1, NIS2, NIS3, and NIS4 are not be directly adjacent to the max touch cell MAX. Accordingly, the noise removing unit 530 may determine that the first to fourth noises NIS1, NIS2, NIS3, and NIS4, which are spaced a distance from the max touch cell MAX, are noise NIS.

The noise removing unit 530 may remove the noise NIS (S260).

The position detection unit 540 may detect a touch position TP on the basis of data from which noise has been removed by the filtering unit 510 and the noise removing unit 530.

Figure 19:
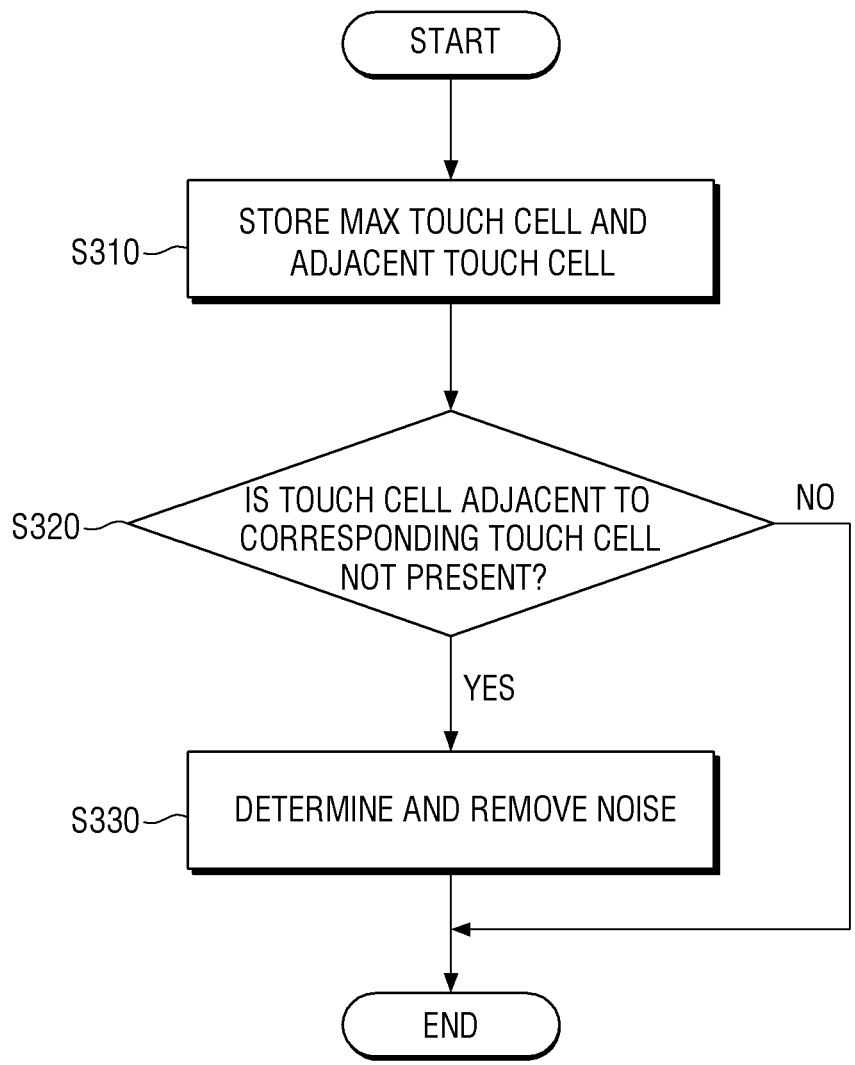
FIG. 19 is a flowchart illustrating a noise detection process of a touch driver in a display device according to another embodiment.

FIG. 19 is another example diagram illustrating a noise detection process of a touch driver in a display device according to an embodiment.

Referring to FIG. 19, the data storage unit 520 may store max data of a max touch cell MAX where a touch pressure is generated (or applied) from among a plurality of touch cells CE and propagation data of an adjacent touch cell ADJ which is directly adjacent to the max touch cell MAX (S310).

The noise removing unit 530 may determine whether or not there is a touch cell adjacent to the corresponding touch cell from among the plurality of touch cells CE (S320).

The noise removing unit 530 may determine that data of a touch cell having no adjacent touch cells from among the plurality of touch cells CE having a plurality of pieces of sensing data SE is noise and may remove the noise (S330). In FIG. 12, the first and second noises NIS1 and NIS2 do not have adjacent touch cells. Because the first and second noises NIS1 and NIS2 do not have adjacent touch cells, the noise removing unit 530 may determine that the first and second noise NIS1 and NIS2 are not data generated by a user's touch input.

Figure 20:
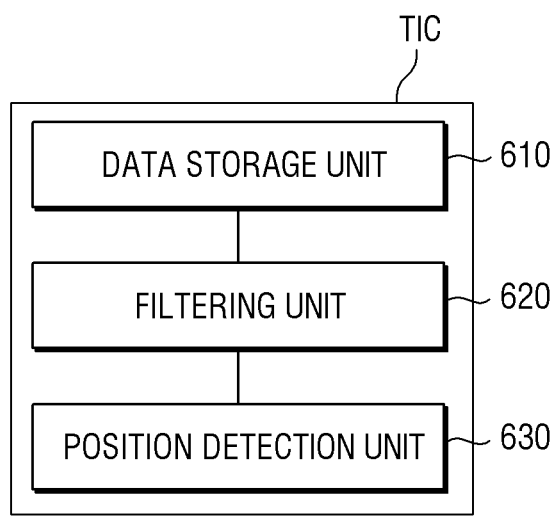
FIG. 20 is a diagram showing a touch driver of a display device according to another embodiment.
Figure 21:
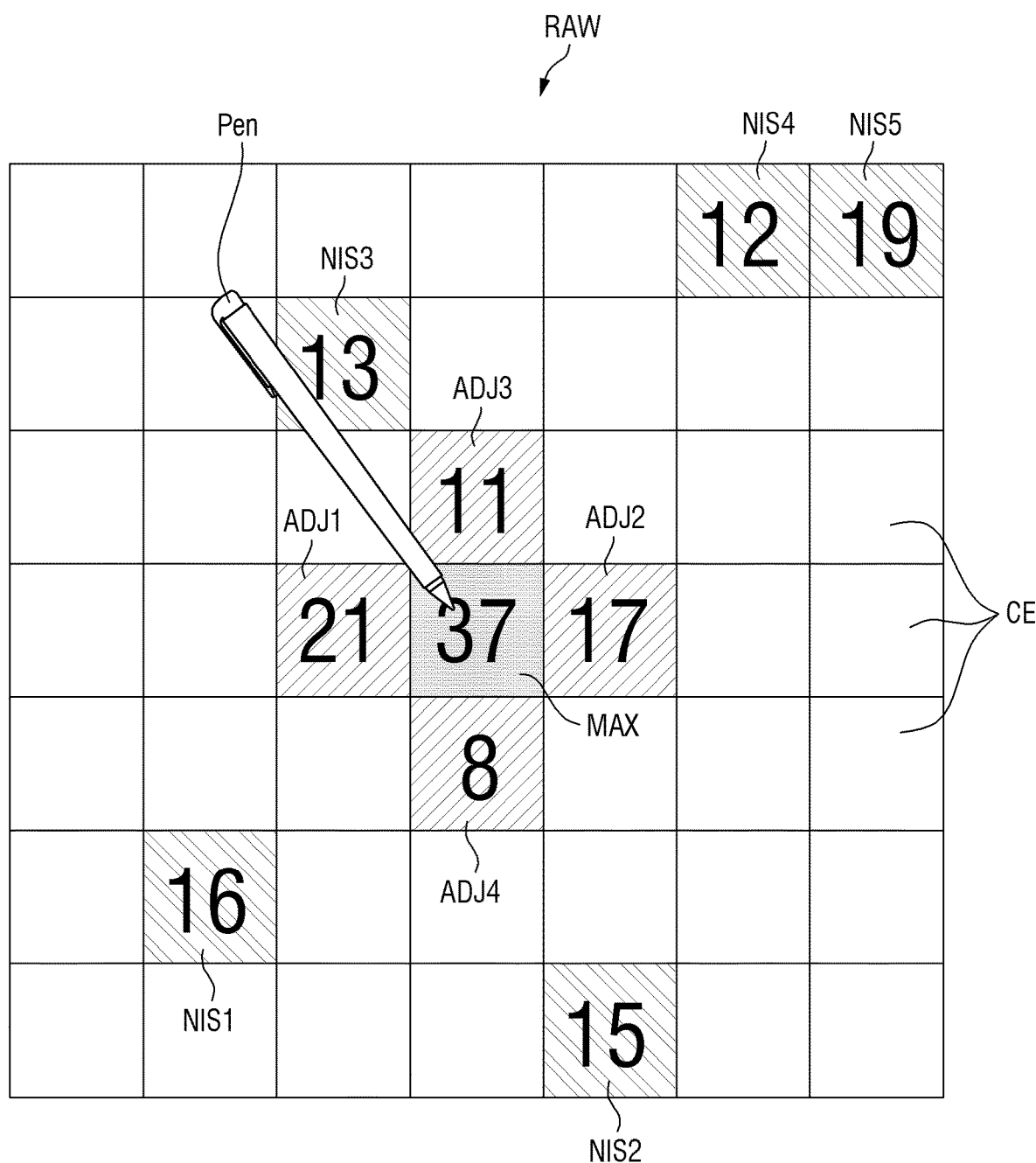
FIG. 21 is a diagram showing raw data generated in a plurality of touch cells in a display device according to another embodiment.
Figure 22:
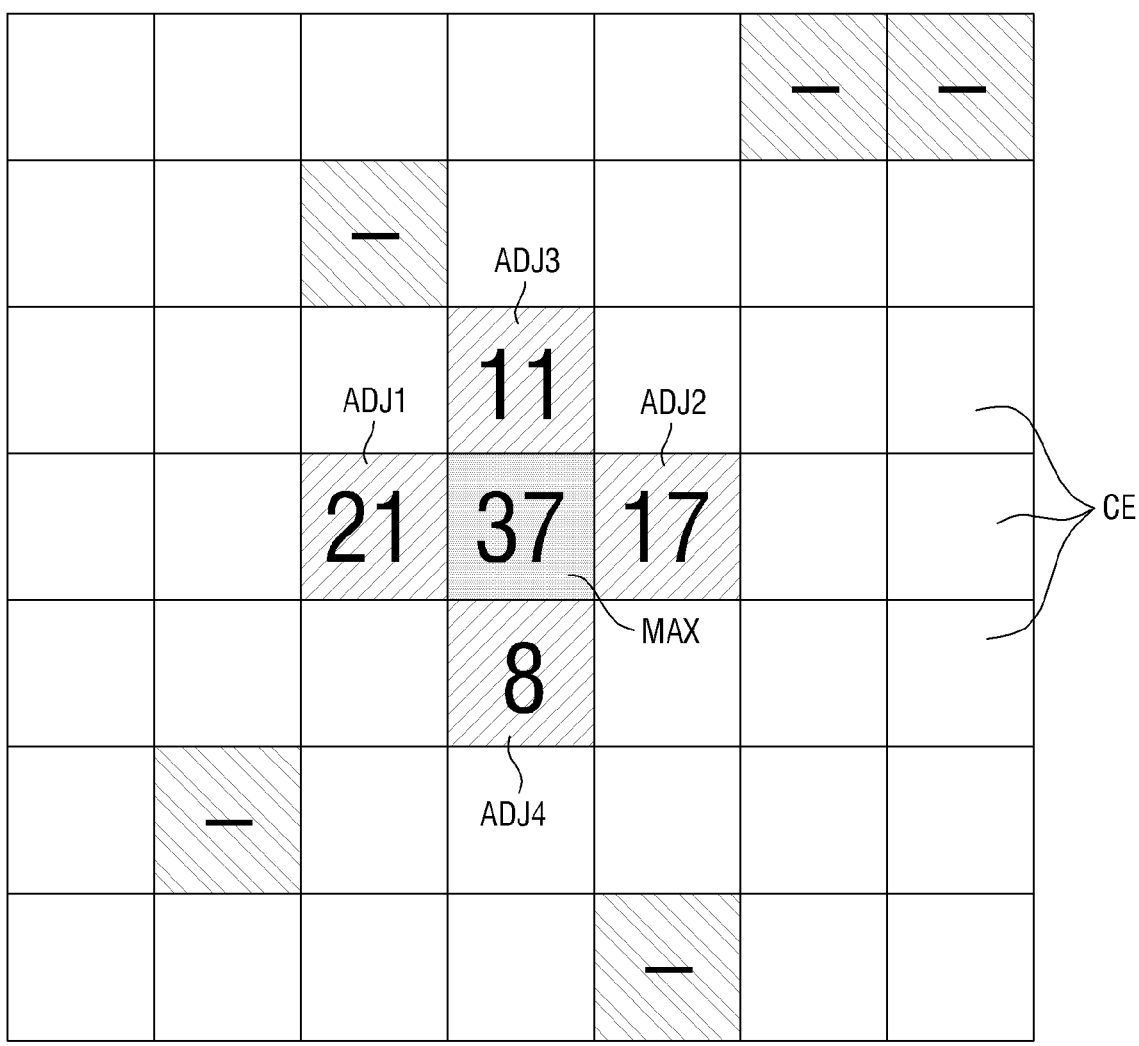
FIG. 22 is a diagram showing storage data stored in a data storage unit from among the raw data shown in FIG. 21 in a display device according to another embodiment.
Figure 23:
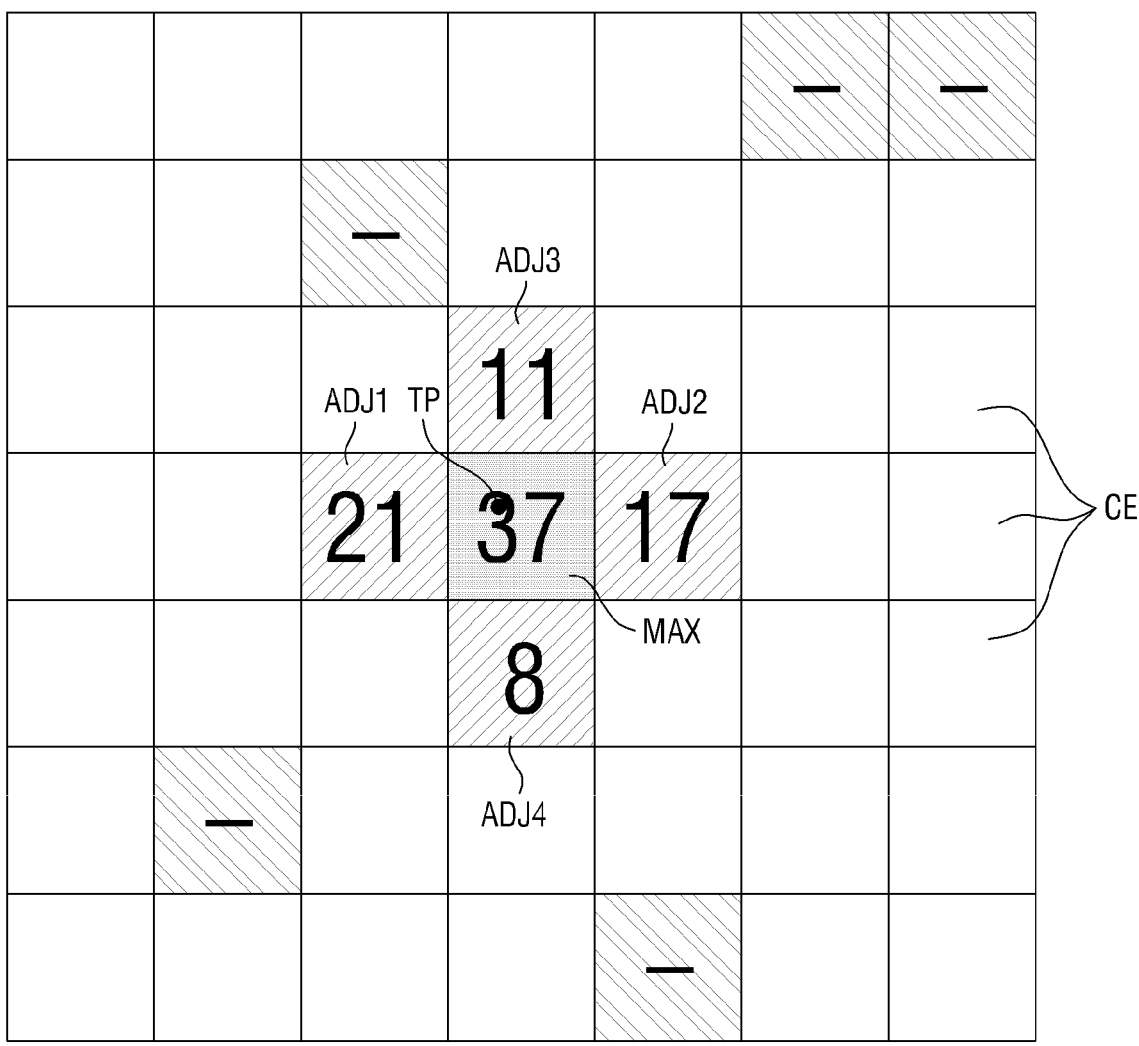
FIG. 23 is a diagram showing a touch position detected by a position detection unit in a display device according to an embodiment.

FIG. 20 is a diagram showing a touch driver of a display device according to another embodiment. FIG. 21 is a diagram showing a plurality of pieces of raw data generated by a plurality of touch cells in a display device according to another embodiment, FIG. 22 is a diagram showing storage data stored in a data storage unit in a display device according to another embodiment, and FIG. 23 is a diagram showing a touch position detected by a position detection unit in a display device according to an embodiment. Data values of the plurality of touch cells shown in FIGS. 20 to 23 are for convenience of description, and thus, the configuration and effect of the present disclosure are not limited to these example data values of the touch cells.

Referring to FIGS. 20 to 23, the touch driver TIC may include a data storage unit 610, a filtering unit 620, and a position detection unit 630.

The data storage unit 610 may receive a plurality of pieces of raw data RAW from a plurality of touch cells CE through one or more sensing lines RL. The data storage unit 610 may extract storage data SD including touch position information and/or touch pressure information from the plurality of pieces of raw data RAW and store the extracted storage data SD. The storage data SD may include max data and propagation data. For example, the data storage unit 610 may store max data of a max touch cell MAX and propagation data of at least one adjacent touch cell ADJ from among the plurality of pieces of raw data RAW. The storage data SD stored in the data storage unit 610 may be protected from the filtering unit 620. For example, the max data and the propagation data may not be removed by the filtering unit 620 irrespective of data size. Accordingly, the data storage unit 610 may store the storage data SD including the touch position information and/or the touch pressure information and exclude the storage data SD from targets to be filtered.

The max data of the max touch cell MAX may have the highest value from among data of the plurality of touch cells CE. For example, the max touch cell MAX may correspond to a touch cell CE which is touched by a user's finger or pen. In a low-resolution force sensor, the size of an area touched by a user may be smaller than the size of each of the plurality of touch cells CE. Accordingly, the area touched by the user may correspond to a portion of the max touch cell MAX.

The at least one adjacent touch cell ADJ may be directly adjacent to the max touch cell MAX. A plurality of adjacent touch cells ADJ may surround (e.g., may surround a periphery of) the max touch cell MAX. For example, first to fourth adjacent touch cells ADJ1, ADJ2, ADJ3, and ADJ4 may be adjacent to left, right, upper, and lower sides of the max touch cell MAX, respectively, when viewed from the top. In FIG. 21, the first adjacent touch cell ADJ1 may be disposed to the left of the max touch cell MAX, the second adjacent touch cell ADJ2 may be disposed to the right of the max touch cell MAX, the third adjacent touch cell ADJ3 may be disposed above the max touch cell MAX, and the fourth adjacent touch cell ADJ4 may be disposed below the max touch cell MAX. However, the arrangement of the plurality of adjacent touch cells ADJ is not limited to the configuration shown in FIG. 21, and the design of the arrangement may be flexibly changed depending on the configuration and arrangement of the plurality of touch cells CE.

The max touch cell MAX may have max data proportional to the magnitude of a touch pressure, and the plurality of adjacent touch cells ADJ may have propagation data generated when the touch pressure generated in the max touch cell MAX is propagates. The size of the propagation data of the adjacent touch cell ADJ may be determined depending on the size of the max data and the distance between the touch position and the corresponding adjacent touch cell ADJ. For example, the size of the propagation data may increase as the size (or magnitude) of the max data increases, and the size of the propagation data of the corresponding adjacent touch cell ADJ may increase as the touch position nears the corresponding adjacent touch cell ADJ.

In FIG. 21, because the touch position of the pen is more adjacent to the first adjacent touch cell ADJ1 than to the second adjacent touch cell ADJ2, the size (21) of the propagation data of the first adjacent touch cell ADJ1 may be greater than the size (17) of the propagation data of the second adjacent touch cell ADJ2. Also, because the touch position of the pen is more adjacent to the third adjacent touch cell ADJ3 than to the fourth adjacent touch cell ADJ4, the size (11) of the propagation data of the third adjacent touch cell ADJ3 may be greater than the size (8) of the propagation data of the fourth adjacent touch cell ADJ4.

In FIGS. 21 and 22, the filtering unit 620 may filter the plurality of pieces of raw data RAW to remove noise NIS. For example, the filtering unit 620 may correspond to a high noise filter that filters out some data from the plurality of pieces of raw data RAW. For example, the filtering unit 620 shown in FIG. 20, which is a high noise filter, may filter out raw data having a greater value than that of the filtering unit 510 shown in FIG. 10.

In FIGS. 21 and 22, the filtering unit 620 may exclude the storage data SD stored by the data storage unit 610 from filtering and may remove raw data of, for example, 20 or less. For example, the filtering unit 620 may filter out and remove noise NIS not stored by the data storage unit 610 from among the plurality of pieces of raw data RAW. The filtering unit 620 may remove data not including the touch position information or the touch pressure information by removing the noise NIS other than the max data and the propagation data stored in the data storage unit 610. Accordingly, the touch driver TIC may accurately detect and remove noise other than data caused by a touch input and may improve the quality of the force sensor.

The position detection unit 630 may detect a touch position TP where a touch pressure is generated (or applied) on the basis of the position of the max touch cell MAX, the value of the max data, the position of the at least one adjacent touch cell ADJ, and the value of the propagation data.

For example, when one adjacent touch cell ADJ is adjacent to the max touch cell MAX, the position detection unit 630 may calculate the touch position by using Equation 1 above. The position detection unit 630 may detect an area of the max touch cell MAX adjacent to the first adjacent touch cell ADJ1 as the touch position where the touch pressure is generated (or applied). For example, as the propagation data value of the adjacent touch cell ADJ increases, the touch position may become closer to an interface between the max touch cell MAX and the adjacent touch cell ADJ. As another example, as the propagation data value of the adjacent touch cell ADJ decreases, the touch position may become closer to a central area of the max touch cell MAX.

In FIG. 23, when a plurality of adjacent touch cells ADJ are adjacent to the max touch cell MAX, the position detection unit 630 may calculate the touch position TP by using Equation 2 above. The position detection unit 630 may detect a partial area of the max touch cell MAX close to the first adjacent touch cell ADJ1 having the highest propagation data value from among the plurality of adjacent touch cells ADJ as the touch position TP. For example, when the first propagation data value of the first adjacent touch cell ADJ1 is greater than the second propagation data value of the second adjacent touch cell ADJ2, the touch position TP may correspond to an area of the max touch cell MAX closer to the first adjacent touch cell ADJ1. As another example, when the first propagation data value of the first adjacent touch cell ADJ1 is greater than the second to fourth propagation data values of the second to fourth adjacent touch cells ADJ2, ADJ3, and ADJ4, the touch position TP may correspond to an area of the max touch cell MAX closer to the first adjacent touch cell ADJ1.

In a low-resolution force sensor, the size of the touch position TP may be smaller than the size of the max touch cell MAX. The touch driver TIC may determine that the touch position TP corresponds to a partial area of the max touch cell MAX by using the position of the max touch cell MAX, the value of the max data, the position of the at least one adjacent touch cell ADJ, and the value of the propagation data. For example, the position detection unit 630 may precisely sense the touch position TP by using interpolation, such as by using Equation 1 or Equation 2 above. Accordingly, the display device according to the present disclosure may sense a precise touch position by using a low-cost, high-efficiency, and low-resolution force sensor.

Figure 24:
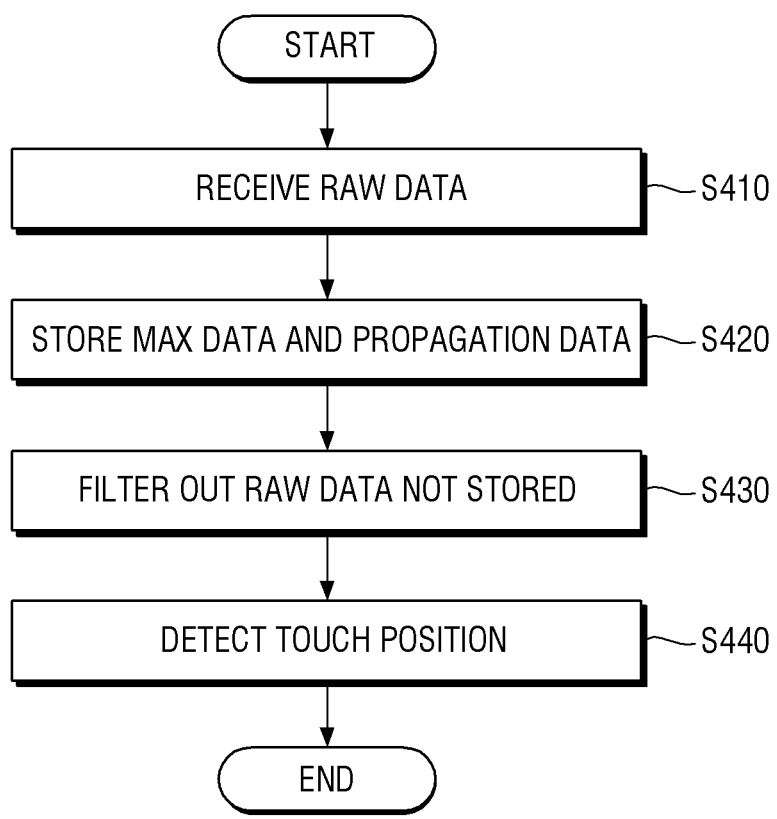
FIG. 24 is a flowchart illustrating a touch position detection process of a touch driver in a display device according to another embodiment.

FIG. 24 is a flowchart illustrating a touch position detection process of a touch driver in a display device according to another embodiment. Here, the above-described elements will be described briefly or omitted.

Referring to FIG. 24, the touch driver TIC may receive a plurality of pieces of raw data RAW from a plurality of touch cells CE through one or more sensing lines RL (S410).

The data storage unit 610 may store max data of a max touch cell MAX and propagation data of at least one adjacent touch cell ADJ from among the plurality of pieces of raw data RAW (S420). The max data and at least one piece of propagation data stored in the data storage unit 610 may be protected from (e.g., excluded from) the filtering unit 620.

The filtering unit 620 may filter out data not stored by the data storage unit 610 from among the plurality of pieces of raw data RAW (S430). The filtering unit 620 may remove data not including touch position information or touch pressure information by removing noises NIS other than the max data and the propagation data stored in the data storage unit 610.

The position detection unit 630 may detect a touch position TP where a touch pressure is generated (or applied) on the basis of the position of the max touch cell MAX, the value of the max data, the position of the at least one adjacent touch cell ADJ, and the value of the propagation data (S440). For example, the position detection unit 630 may precisely sense the touch position TP by using interpolation, such as by using Equation 1 or Equation 2 above. Accordingly, the display device according to the present disclosure may sense a precise touch position by using a low-cost, high-efficiency, and low-resolution force sensor.

With the force sensor and the display device including the same according to an embodiment, it is possible to precisely sense a touch position even in a low-cost, high-efficiency, and low-resolution force sensor by storing max data having the highest value from among a plurality of pieces of sensing data passing through a low noise filter and propagation data of at least one adjacent touch cell adjacent to a max touch cell having the max data and by detecting and removing noise from the plurality of pieces of sensing data.

With the force sensor and the display device including the same according to an embodiment, it is possible to precisely sense a touch position even in a low-cost, high-efficiency, and low-resolution force sensor by storing max data having the highest value from among a plurality of pieces of raw data and propagation data of at least one adjacent touch cell adjacent to a max touch cell having the max data and filtering raw data not stored among the plurality of pieces of raw data using a high noise filter.

The aspects and features of the present invention are not limited to those described above, and various other aspects and features are included in this specification.

Although exemplary embodiments of the present invention have been described with reference to the accompanying drawings, those skilled in the art will appreciate that various modifications and alterations may be made therein without departing from the spirit or essential feature of the present invention. Therefore, the above embodiments are to be regarded as illustrative rather than restrictive. The present invention is to be defined based on the appended claims and their equivalents.

What is claimed is:

1. A force sensor comprising:
a plurality of touch cells comprising a plurality of driving electrodes, a pressure sensing layer overlapping the plurality of driving electrodes, and a plurality of sensing electrodes overlapping the pressure sensing layer; and
a touch driver configured to receive a plurality of pieces of raw data from the plurality of touch cells and to detect a touch pressure applied to the plurality of touch cells, the touch driver comprising:
a filtering unit configured to filter the plurality of pieces of raw data and to output a plurality of pieces of sensing data;
a data storage unit configured to store max data having the highest value from among the plurality of pieces of sensing data and propagation data of at least one adjacent touch cell adjacent to a max touch cell having the max data; and
a noise removing unit configured to detect and remove noise from the plurality of pieces of sensing data,
wherein the noise removing unit is configured to determine that data of at least one of the touch cells having no adjacent touch cell from among the plurality of touch cells having the plurality of pieces of sensing data is noise.

2. The force sensor of claim 1, wherein the noise removing unit is configured to determine that data of at least one of the touch cells spaced a distance from the max touch cell is noise.

3. The force sensor of claim 1, wherein the noise removing unit is configured to determine that data of at least one of the touch cells not directly adjacent to the max touch cell is noise.

4. The force sensor of claim 1, wherein the data storage unit is configured to store the max data and propagation data of first to fourth adjacent touch cells adjacent to upper, lower, left, and right sides of the max touch cell when viewed from above.

5. The force sensor of claim 1, wherein the noise removing unit is configured to remove sensing data not stored by the data storage unit from among the plurality of pieces of sensing data.

6. The force sensor of claim 1, wherein the touch driver further comprises a position detection unit configured to detect a touch position where the touch pressure is applied based on a position of the max touch cell, a value of the max data, a position of the at least one adjacent touch cell, and a value of the propagation data.

7. The force sensor of claim 6, wherein when one adjacent touch cell is adjacent to the max touch cell, the position detection unit is configured to calculate the touch position by using Equation 1:

$$x = \frac{d1 \times x1 + d2 \times x2}{d1 + d2} \quad \text{[Equation 1]}$$

wherein x is touch position, d1 is max data value, d2 is propagation data value, x1 is position of max touch cell, and x2 is position of adjacent touch cell.

8. The force sensor of claim 7, wherein the max touch cell has a first area adjacent to the adjacent touch cell and a second area not adjacent to the adjacent touch cell, and
wherein the position detection unit is configured to detect a portion of the first area of the max touch cell as the touch position where the touch pressure is applied.

9. The force sensor of claim 6, wherein when a plurality of adjacent touch cells is adjacent to the max touch cell, the position detection unit is configured to calculate the touch position by using Equation 2:

$$x = \frac{d1 \times x1 + d2 \times x2 + \cdots + dn \times xn}{d1 + d2 + \cdots + dn} \quad \text{[Equation 2]}$$

wherein x is touch position, d1 is max data value, d2 is first propagation data value, do is (n−1)th propagation data value, x1 is position of max touch cell, x2 is position of first adjacent touch cell, and xn is position of (n−1)th adjacent touch cell.

10. The force sensor of claim 9, wherein the max touch cell has a first area adjacent to a first adjacent touch cell having the highest propagation data value from among the plurality of adjacent touch cells and a second area not adjacent to the first adjacent touch cell, and
wherein the position detection unit is configured to detect a portion of the first area of the max touch cell as the touch position where the touch pressure is applied.

11. A display device comprising:
a display panel configured to display an image; and
a force sensor on one surface of the display panel, the force sensor comprising:
a plurality of touch cells comprising a plurality of driving electrodes, a pressure sensing layer overlapping the plurality of driving electrodes, and a plurality of sensing electrodes overlapping the pressure sensing layer; and
a touch driver configured to receive a plurality of pieces of raw data from the plurality of touch cells and to detect a touch pressure applied to the plurality of touch cells, the touch driver comprising:
a filtering unit configured to filter the plurality of pieces of raw data and to output a plurality of pieces of sensing data;
a data storage unit configured to store max data having the highest value from among the plurality of pieces of sensing data and propagation data of at least one adjacent touch cell adjacent to a max touch cell having the max data; and
a noise removing unit configured to detect and remove noise from the plurality of pieces of sensing data,
wherein the noise removing unit is configured to determine that data of at least one of the touch cells having no adjacent touch cell from among the plurality of touch cells having the plurality of pieces of sensing data is noise.

12. A force sensor comprising:
a plurality of touch cells comprising a plurality of driving electrodes configured to receive a touch driving voltage, a plurality of sensing electrodes configured to output a plurality of pieces of raw data, and a pressure sensing layer between the plurality of driving electrodes and the plurality of sensing electrodes; and
a touch driver configured to receive the plurality of pieces of raw data and to detect a touch pressure applied to the plurality of touch cells, the touch driver comprising:
a data storage unit configured to store max data having the highest value from among the plurality of pieces of raw data, to store propagation data of at least one adjacent touch cell adjacent to a max touch cell having the max data, and to not store pieces of raw data of touch cells except the max touch cell and the at least one adjacent touch cell; and
a filtering unit configured to filter out raw data not stored in the data storage unit from among the plurality of pieces of raw data.

13. The force sensor of claim 12, wherein the data storage unit is configured to store the max data and propagation data of first to fourth adjacent touch cells adjacent to upper, lower, left, and right sides of the max touch cell when viewed from above.

14. The force sensor of claim 12, wherein the touch driver further comprises a position detection unit configured to detect a touch position where the touch pressure is applied based on a position of the max touch cell, a value of the max data, a position of the at least one adjacent touch cell, and a value of the propagation data.

15. The force sensor of claim 14, wherein when one adjacent touch cell is adjacent to the max touch cell, the position detection unit is configured to calculate the touch position by using Equation 1:

$$x = \frac{d1 \times x1 + d2 \times x2}{d1 + d2}$$ [Equation 1]

wherein x is touch position, d1 is max data value, d2 is propagation data value, x1 is position of max touch cell, and x2 is position of adjacent touch cell.

16. The force sensor of claim 15, wherein the max touch cell has a first area adjacent to the adjacent touch cell and a second area not adjacent to the adjacent touch cell, and
wherein the position detection unit is configured to detect a portion of the first area of the max touch cell as the touch position where the touch pressure is applied.

17. The force sensor of claim 14, wherein when a plurality of adjacent touch cells is adjacent to the max touch cell, the position detection unit is configured to calculate the touch position by using Equation 2:

$$x = \frac{d1 \times x1 + d2 \times x2 + \cdots + dn \times xn}{d1 + d2 + \cdots + dn}$$ [Equation 2]

wherein x is touch position, d1 is max data value, d2 is first propagation data value, do is (n−1)th propagation data value, x1 is position of max touch cell, x2 is position of first adjacent touch cell, and xn is position of (n−1)th adjacent touch cell.

18. The force sensor of claim 17, wherein the max touch cell has a first area adjacent to an adjacent touch cell having the highest propagation data value from among the plurality of adjacent touch cells and a second area adjacent to the other adjacent touch cells from among the plurality of adjacent touch cells, and
wherein the position detection unit is configured to detect a portion of the first area of the max touch cell as the touch position where the touch pressure is applied.

19. A display device comprising:
a display panel configured to display an image; and
a force sensor on one surface of the display panel, the force sensor comprising:
a plurality of touch cells comprising a plurality of driving electrodes configured to receive a touch driving voltage, a plurality of sensing electrodes configured to output a plurality of pieces of raw data, and a pressure sensing layer between the plurality of driving electrodes and the plurality of sensing electrodes; and
a touch driver configured to receive the plurality of pieces of raw data and to detect a touch pressure on the plurality of touch cells, the touch driver comprising:
a data storage unit configured to store max data having the highest value from among the plurality of pieces of raw data, to store propagation data of at least one adjacent touch cell adjacent to a max touch cell having the max data, and to not store pieces of raw data of touch cells except the max touch cell and the at least one adjacent touch cell; and
a filtering unit configured to filter out raw data not stored in the data storage unit from among the plurality of pieces of raw data.

\* \* \* \* \*